United States Patent
Ohta

(10) Patent No.: US 6,781,586 B1
(45) Date of Patent: Aug. 24, 2004

(54) INTERPOLATION PROCESSING APPARATUS, INTERPOLATION PROCESSING METHOD AND IMAGE DISPLAY APPARATUS

(75) Inventor: Akihiro Ohta, Tokyo (JP)

(73) Assignee: Sony Corporation, Tokyo (JP)

(*) Notice: Subject to any disclaimer, the term of this patent is extended or adjusted under 35 U.S.C. 154(b) by 297 days.

(21) Appl. No.: 09/707,719

(22) Filed: Nov. 7, 2000

(30) Foreign Application Priority Data

Nov. 8, 1999 (JP) .......................................... 11-316468

(51) Int. Cl.[7] .............................................. G06F 15/80
(52) U.S. Cl. ...................... 345/505; 345/475; 345/606; 345/560; 382/300; 382/304
(58) Field of Search ................................ 345/505, 213, 345/606–609, 475, 535, 541, 560; 382/300, 304

(56) References Cited

U.S. PATENT DOCUMENTS 4,665,556 A * 5/1987 Fukushima et al.
5,986,635 A * 11/1999 Naka et al.
6,477,281 B2 * 11/2002 Mita et al.

* cited by examiner

Primary Examiner—Matthew C. Bella
Assistant Examiner—Hau Nguyen
(74) Attorney, Agent, or Firm—Frommer Lawrence & Haug LLP; William S. Frommer; Dennis M. Smid

(57) ABSTRACT

The invention provides an interpolation processing apparatus, an interpolation processing method and an image display apparatus wherein, when applied, for example, to format conversion for which a programmable video digital signal processor is used, processes such as format conversion can be executed by a comparatively simple process. The programmable video digital signal processor includes a plurality of element processors whose operations are controlled simultaneously and parallelly. The element processors are controlled so as to produce corresponding weighting coefficients based on number data individually allocated thereto. Where image data, for example, for one line are successively inputted to and processed by the element processors, an interpolation process is performed by an arithmetic operation process common to the element processors in which the position information of the number of lines or like is used as a variable.

15 Claims, 18 Drawing Sheets

FIG. 1A

| 1 | 2 | 3 | 4 | 5 | 6 | 7 | 8 |
|---|---|---|---|---|---|---|---|
| A | B | C | D | – | E | F | G |
| – | A | B | C | D | – | E | F |

FIG. 1B $\boxed{\mathrm{mod}(PENO \times \frac{1}{5})}$ — COM

| 1 | 2 | 3 | 4 | 5 | 6 | 7 | 8 |
|---|---|---|---|---|---|---|---|
| A | B | C | D | – | E | F | G |
| – | A | B | C | D | – | E | F |
| 0 | 1 | 2 | 3 | 4 | 0 | 1 | 2 | amari

FIG. 1D $\boxed{\div 5}$ — COM

| 1 | 2 | 3 | 4 | 5 | 6 | 7 | 8 |
|---|---|---|---|---|---|---|---|
| A | B | C | D | – | E | F | G |
| – | A | B | C | D | – | E | F |
| 0 | 0.2 | 0.4 | 0.6 | 0.8 | 0 | 0.2 | 0.4 | x →

FIG. 1F $\boxed{1-x}$ — COM

| 1 | 2 | 3 | 4 | 5 | 6 | 7 | 8 |
|---|---|---|---|---|---|---|---|
| A | B | C | D | – | E | F | G |
| – | A | B | C | D | – | E | F |
| 0 | 0.2 | 0.4 | 0.6 | 0.8 | 0 | 0.2 | 0.4 |
| 0 | 0.8 | 0.6 | 0.4 | 0.2 | 0 | 0.8 | 0.6 |

1-x →

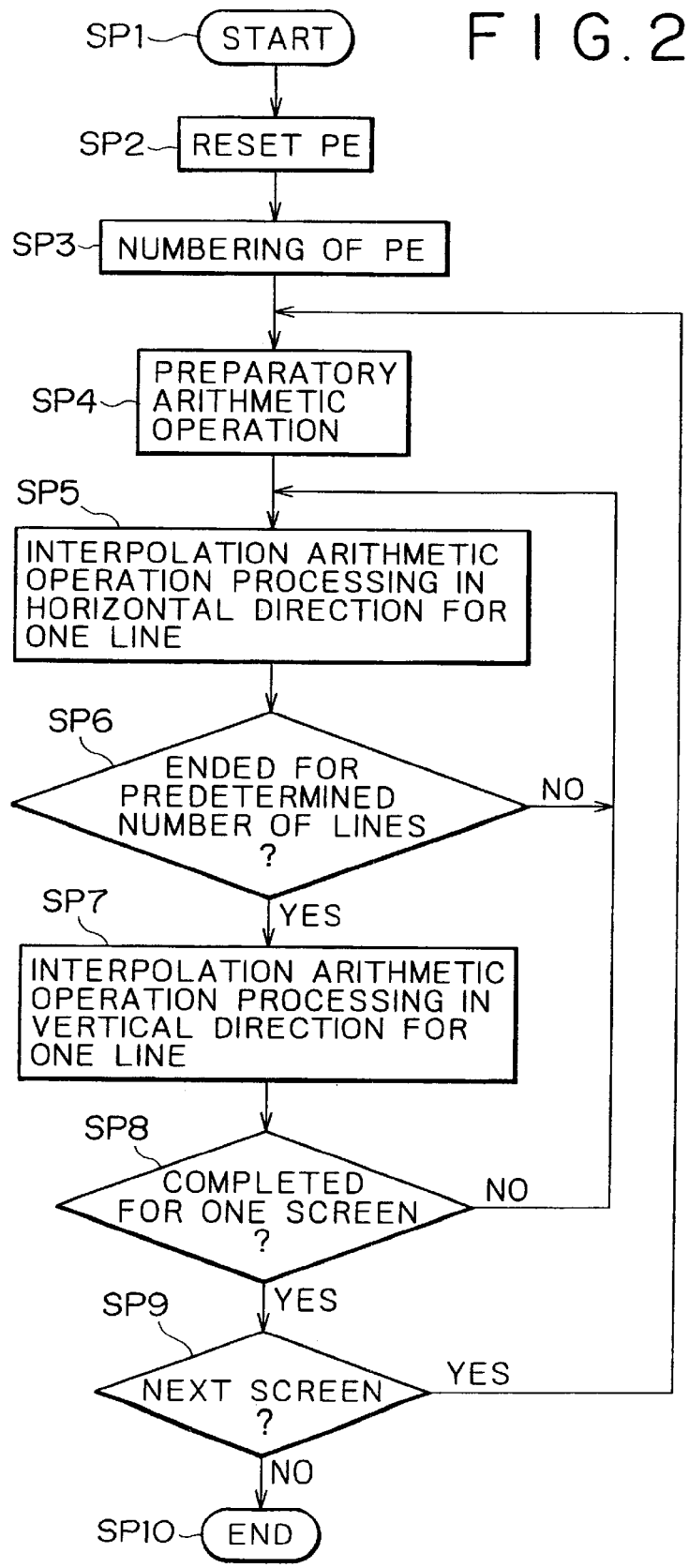

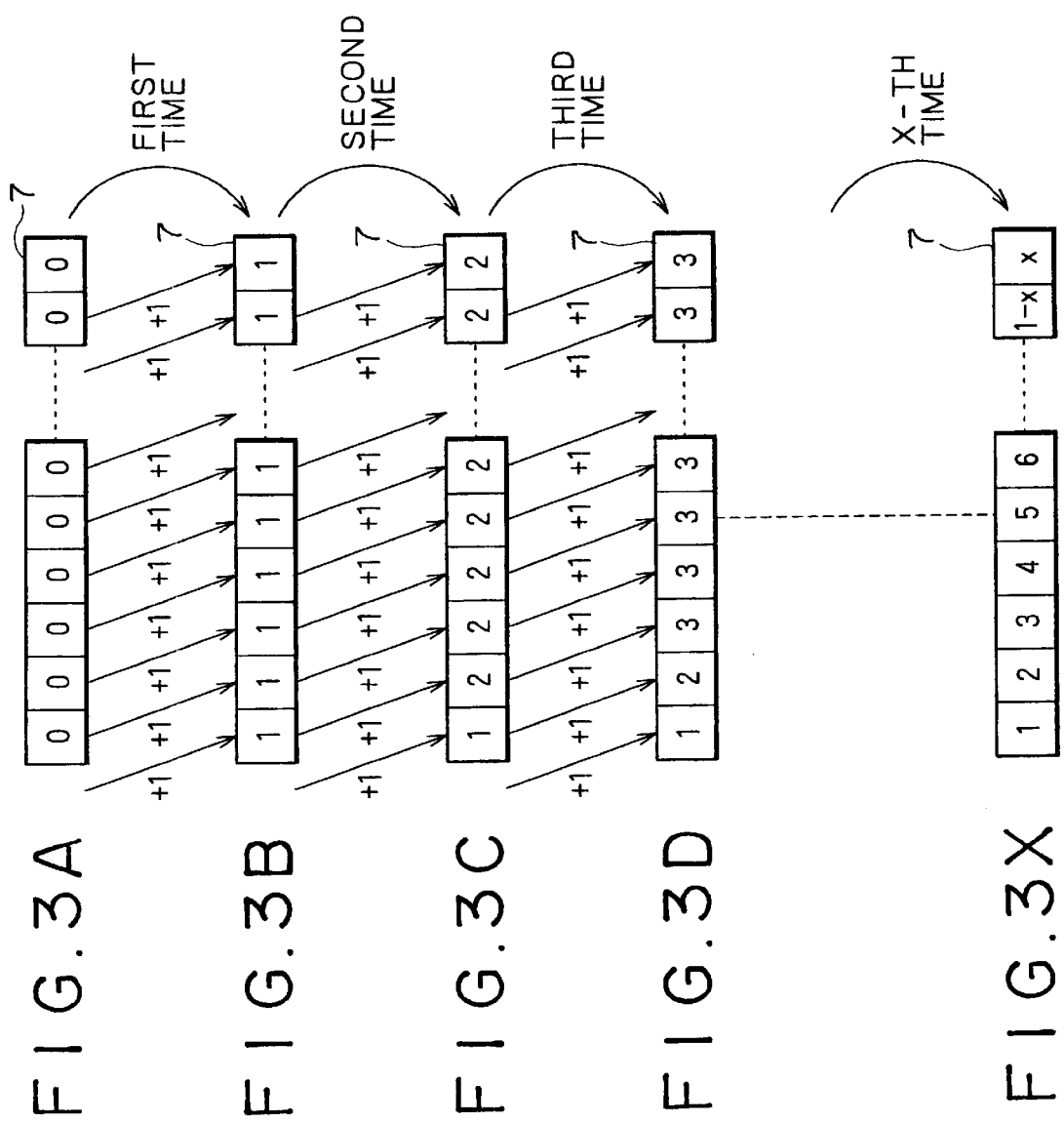

| PE NUMBER/M | 0 | 1 | 2 | 3 | 4 |
|---|---|---|---|---|---|
| INPUT DATA | in | in | in | in | skip |
| (1-x) | 0 | 1/5 | 2/5 | 3/5 | 4/5 |
| x | 1 | 4/5 | 3/5 | 2/5 | 1/5 |
| Data1 | | A | B | C | D |
| Data2 | A | B | C | D | E |
| OUTPUT IMAGE DATA | a | b | c | d | e |

| PE NUMBER/L | 0 | 1 | 2 | 3 | 4 |
|---|---|---|---|---|---|
| INPUT DATA | in | in | in | in | skip |
| (1-x) | 1 | 3/4 | 1/2 | 1/4 | 0 |
| x | 0 | 1/4 | 1/2 | 3/4 | 0 |
| Data1 | A | B | C | D | |
| Data2 | B | C | D | E | |
| OUTPUT IMAGE DATA | a | b | c | d | e |

F I G. 17
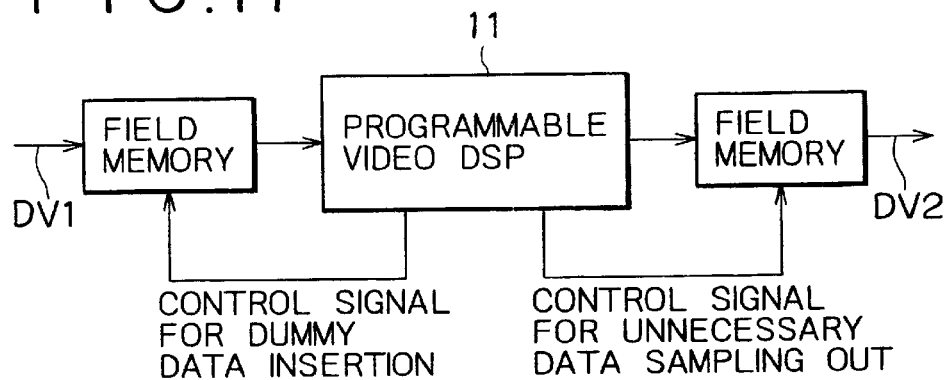
F I G. 18
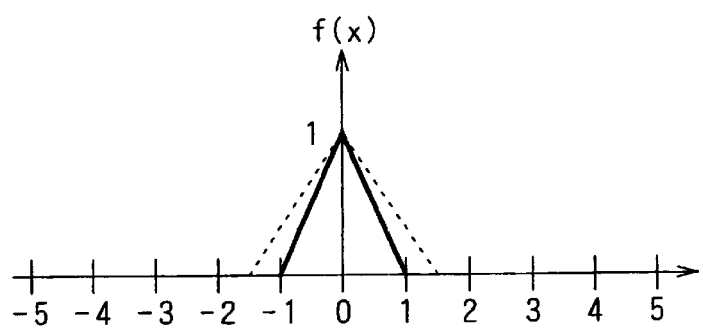
F I G. 19
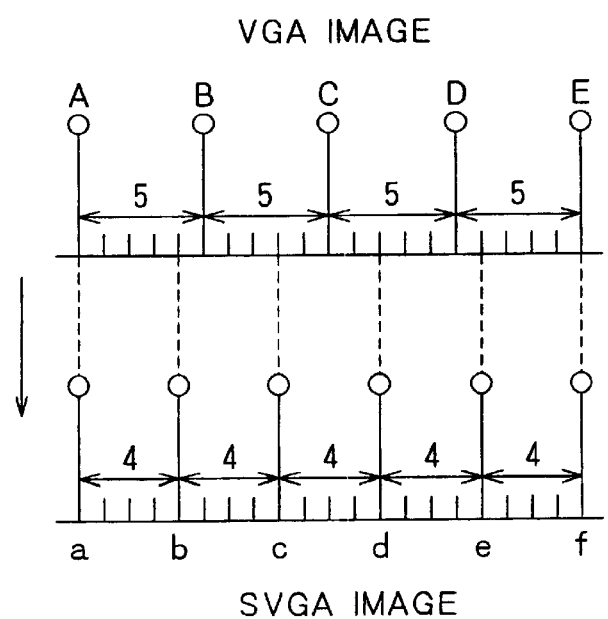

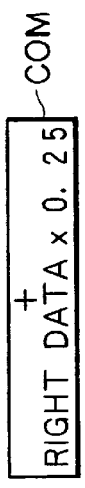
FIG. 24A
FIG. 24B
FIG. 24C
FIG. 24D
FIG. 24E
FIG. 24F
FIG. 24G

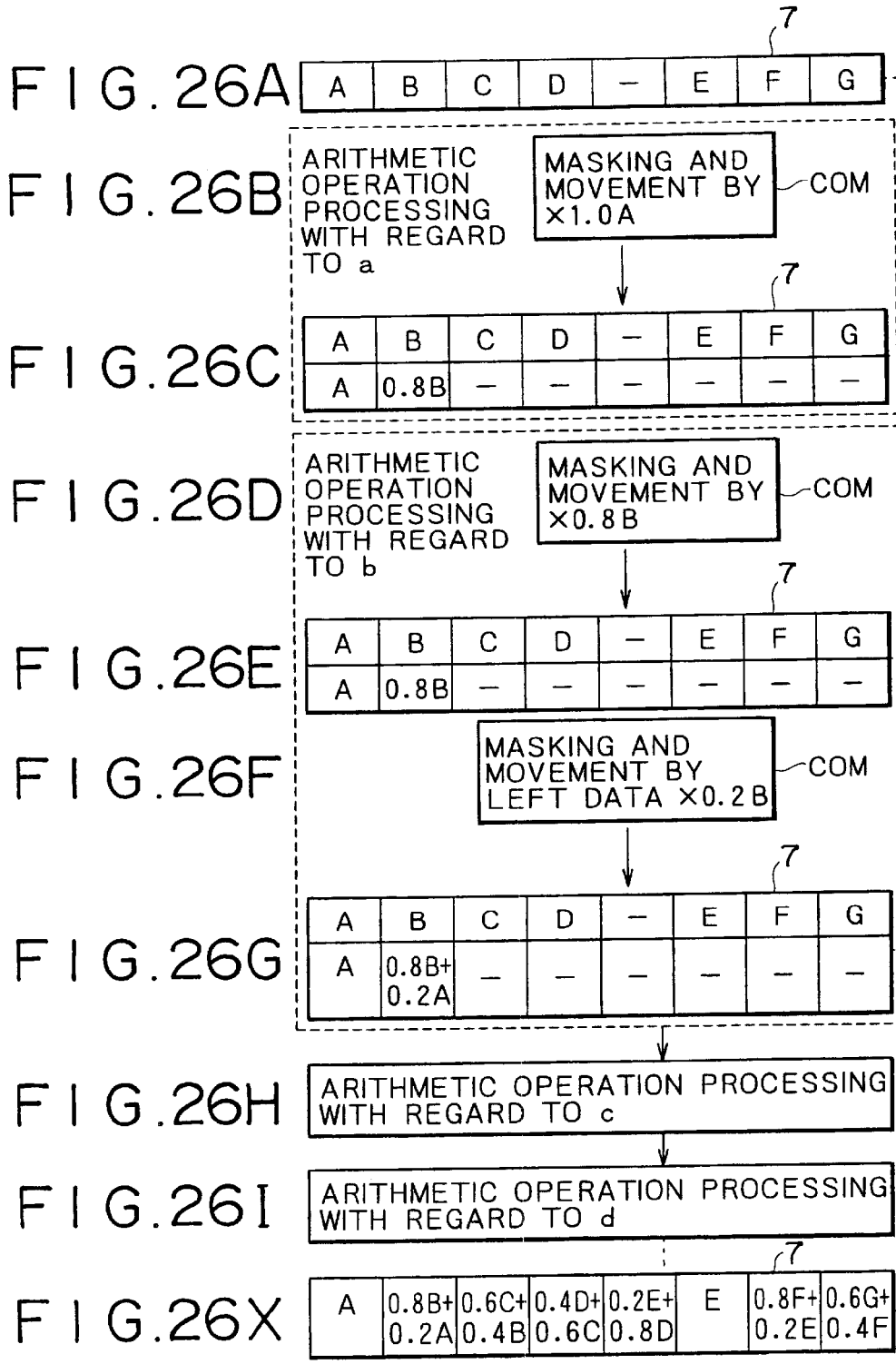

INTERPOLATION PROCESSING APPARATUS, INTERPOLATION PROCESSING METHOD AND IMAGE DISPLAY APPARATUS

BACKGROUND OF THE INVENTION

This invention relates to an interpolation processing apparatus, an interpolation processing method and an image display apparatus, and more particularly to an interpolation processing apparatus, an interpolation processing method and an image display apparatus suitably applied to format conversion of image data in which, for example, a programmable video DSP (Digital Signal Processor) is used.

Conventionally, various apparatus such as an image display apparatus execute a process for format conversion by converting the number of pixels of image data by an interpolation arithmetic operation process. In such a process for format conversion as just mentioned, a device for exclusive use in the form of an ASIC (Application Specific IC) is used popularly.

In particular, various formats are available for image data. For example, in the VGA (Video Graphics Array), a screen is composed of 640×480 pixels or dots. Meanwhile, in the SVGA (Super VGA), a screen is composed of 800×600 pixels or dots; in the XGA (extended Graphics Array), a screen is composed of 1,024×768 pixels or dots; and in the UXGA (Ultra XGA), a screen is composed of 1,600×1,200 pixels or dots.

The VGA and so forth mentioned above are formats applied to computer equipments. However, for image data, various formats which are different in the number of pixels, scanning number of lines and so forth also depending upon the system of television broadcasting are available in addition to the formats applied to computer equipments.

Meanwhile, as display apparatus for displaying image data, fixed pixel displaying devices such as a liquid crystal display (LCD) device and a digital micromirror device (DMD) are available. Each of such fixed pixel displaying devices can display a fixed number of pixels and has a unique resolution based on the number of pixels.

If a display apparatus having a unique resolution is connected so that image data of a format which does not comply with the resolution are inputted thereto, then a process of format conversion for converting the number of pixels is required. This format conversion process is executed using an interpolation arithmetic operation process. More particularly, if it is intended to display a television broadcast on a liquid crystal display apparatus, then a process of format conversion is required because of difference between the format used by the liquid crystal display apparatus and the format of the television broadcast. An interpolation arithmetic operation process for such conversion of the number of pixels is applied not only to such format conversion of image data as described above but also to partial enlargement or contraction of an image.

Such an interpolation arithmetic operation process as described above is executed by successive weighted addition of image data with weighting coefficients produced using an interpolation function. In order to allow format conversion, enlargement of an image or reduction of an image with a high picture quality, various functions are selectively used as the interpolation function.

FIG. 18 is a characteristic diagram illustrating an interpolation function f(x) according to a bilinear approximate function which is one of such interpolation functions as just described. The interpolation function f(x) illustrated in FIG. 18 can be expressed in accordance with the following expressions using a phase x normalized with a pixel interval:

$$f(x)=1-|x|(|x|\leq 1)\ f(x)=0\ (|x|>1) \quad (1)$$

Meanwhile, FIG. 19 is a diagram illustrating a relationship of pixels in a horizontal direction or a vertical direction between VGA image data and SVGA image data. The number of pixels of the VGA is 640×480 dots while the number of pixels of the SVGA is 800×600 dots, and the ratio in number of pixels between the VGA and the SVGA is 4:5. Consequently, the relationship of pixels illustrated in FIG. 19 repetitively appears in a horizontal direction and a vertical direction. It is to be noted that the values 5 and 4 between pixels in FIG. 19 denote numerical values representative of pixel intervals in image data of the VGA and image data of the SVGA, respectively.

The pixel of the SVGA denoted by reference character a in FIG. 19 overlaps with the pixel of the VGA denoted by reference character A and has a phase x equal to the value 0 with respect to the pixel A. Meanwhile, the phase x of the pixel a has the different value 1 with respect to the pixel B next to the pixel A and has values greater than 1 individually with respect to the pixels denoted by reference characters C to E. Consequently, when the interpolation function of the expressions (1) is used to perform format conversion of image data of the VGA into image data of the SVGA, with regard to the pixel a, a weighting coefficient of the value 1 is produced for the pixel A, and another weighting coefficient of the value 0 is produced for the other pixels B to E.

The pixel of the SVGA denoted by reference character b has the phase x of the value $-\frac{1}{5}$ with respect to the pixel A. Meanwhile, the phase x of the pixel b has the value $\frac{4}{5}$ with respect to the pixel B next to the pixel A and has values greater than 1 individually with respect to the pixels C to E. Consequently, when format conversion of image data of the VGA into image data of the SVGA is to be performed, with regard to the pixel b, weighting coefficients of the values $\frac{1}{5}$ and $\frac{4}{5}$ are produced for the pixels A and B, respectively, and another weighting coefficient of the value 0 is produced for the other pixels C to E similarly.

The pixel of the SVGA denoted by reference character c has the phase x of the value $-\frac{3}{5}$ with respect to the pixel B. Meanwhile, the phase x of the pixel c has the value $\frac{2}{5}$ with respect to the pixel C next to the pixel B and has values greater than 1 individually with respect to the other pixels A, D and E. Consequently, when format conversion of the image data is to be formed, with regard to the pixel c, weighting coeffecients of the values $\frac{2}{5}$ and $\frac{3}{5}$ are produced for the pixels B and C, respectively, and another weighting coeffecient of the value 0 is produced for the other pixels A, D and E similarly.

Further, when format conversion of image data is to be performed, with regard to the pixel of the SVGA denoted by reference character d, weighting coefficients of the values $\frac{3}{5}$ and $\frac{2}{5}$ are produced for the pixels C and D, respectively, and with regard to the pixel of the SVGA denoted by reference character e, weighting coeffecients of the values $\frac{4}{5}$ and $\frac{1}{5}$ are produced for the pixels D and E, respectively.

Consequently, when the bilinear approximate function is used to perform format conversion of image data of the VGA into image data of the SVGA, a weighted addition process represented by the following expressions is repeated to produce image data of the SVGA:

$$a=1\times A$$

$$b=\frac{1}{5}\times A+\frac{4}{5}\times B$$

$$c=\frac{2}{5}\times B+\frac{3}{5}\times C$$

$$d=\tfrac{3}{5}\times C+\tfrac{2}{5}\times D$$

$$e=\tfrac{4}{5}\times D+\tfrac{1}{5}\times E$$

$$f=1\times E \qquad (2)$$

A device for exclusive use which employs an ASIC includes, in order for the arithmetic operation process given by the expressions (2) above to be executed at a high speed, a coefficient generation circuit for holding and successively outputting weighting coefficients, a multiplication circuit for multiplying input image data by the weighting coefficients to weight the input data, and an addition circuit for adding results of the weighting by the multiplication circuit. The device can thus process an image on the real time basis and display also moving pictures without giving an unfamiliar feeling to a viewer.

While such a device for exclusive use employing an ASIC is used, in the field of image processing, various image processes are executed using a device for universal use in the form of a DSP (Digital Signal Processor). The DSP is a processor wherein an ALU (Arithmetic Logic Unit) operates in accordance with a sequence programmed in advance to execute an aimed signal process, and can be applied to various processes by changing the program.

A DSP adapted for image processing is constructed such that a large number of ALUs are disposed so as to allow simultaneous parallel processing of successive data so that also image data having a high sampling rate can be processed. A DSP of the type just described is generally called programmable video DSP.

FIG. 20 is a block diagram showing a programmable video DSP. Referring to FIG. 20, the programmable video DSP 1 shown includes an arithmetic operation processing section 3 to which time series successive image data DV1 are inputted through a buffer 2. The arithmetic operation processing section 3 executes a predetermined arithmetic operation process for the image data DV1 and outputs resulting data through another buffer 4. The arithmetic operation processing section 3 is formed from a plurality of processor elements (PEs) 5.

Each of the PEs 5 shown includes, as shown in FIG. 21, an ALU 6 including a multiplier, and a local memory 7 for storing input and output data to and from the ALU 6. Each of the PEs 5 repetitively performs a process of multiplying and adding data stored in the local memory 7 thereof and storing resulting data into the local memory 7 to execute a predetermined arithmetic operation process in accordance with an instruction from a controller 8 (FIG. 20). Each of the PEs 5 temporarily stores image data DV1 of the buffer 2 into the local memory 7, and further stores arithmetic operation process results DV2 into the local memory 7 and outputs the arithmetic operation process results DV2 to the buffer 4. Consequently, the programmable video DSP 1 can be represented in a modeled form from the ALUs 6 and the local memories 7 which form the PEs 5 as seen in FIG. 22.

The controller 8 records a series of processing procedures into a memory 9 under the control of an external apparatus and outputs commands to the PEs 5 in accordance with the recorded processing procedures. Control of the PEs 5 by the controller 8 is performed in accordance with a single instruction-stream multiple data-stream (SIMD) system wherein the same command COM is outputted to all of the PEs 5 so that the command is executed simultaneously and parallelly. It is to be noted that a horizontal synchronizing signal HD, a vertical synchronizing signal VD and so forth are inputted to the programmable video DSP 1, and the horizontal synchronizing signal HD and the vertical synchronizing signal VD are used as a reference for operation.

More particular description is given by way of an example wherein a programmable video DSP 1 is used to form a low-pass filter according to the bilinear approximate function given as the expressions (1) hereinabove. The relationship of pixels before and after a process by a low-pass filter can be represented in such a manner as seen in FIG. 23 in contrast to FIG. 19. In this instance, as the low-pass filter is formed, the interpolation function f(x) thereof has a characteristic widened in the direction of the phase x as indicated by broken lines in FIG. 18 in accordance with a characteristic of the low-pass filter, and also the expressions (1) are applied in a correspondingly modified form.

Here, it is assumed that the tap number is 3 and weighting coefficients according to a combination of, for example, (0.5, 1.0. 0.5) are calculated using the bilinear approximate function modified in such a manner as described above. It is to be noted, when the weighting coefficients are arithmetically operated actually, filter coefficients normalized with a sum total of the coefficients are used for the arithmetic operation and the combination of coefficients of (0.25, 0.5, 0.25) is used. In this instance, as all output image data and input image data are held in an equal phase relationship as seen from the phase relationship of FIG. 23, equal filter coefficients are applied to all of the output image data.

Consequently, in an arithmetic operation process in which the weighting coefficients according to the combination of (0.5, 1.0, 0.5) are used, successive output image data can be band-limited by repetition of the same arithmetic operation process in which corresponding input image data and image data preceding and following the input image data are used as given by the following expression:

$$B'=\tfrac{1}{4}\times A+\tfrac{1}{2}\times B+\tfrac{1}{4}\times C$$

$$C'=\tfrac{1}{4}\times B+\tfrac{1}{2}\times C+\tfrac{1}{4}\times D$$

$$D'=\tfrac{1}{4}\times C+\tfrac{1}{2}\times D+\tfrac{1}{4}\times E \qquad (3)$$

In the programmable video DSP 1, the successive input image data A to H are successively stored into the local memory 7 of each of the PEs as seen in FIG. 24A, and then a command COM is issued to all of the PEs 5 to multiply the image data A to H stored in the local memory 7 by 0.5 as seen in FIG. 24B. Consequently, each of the PEs 5 multiplies the image data A to H by 0.5 and stores resulting image data into the local memory 7 as seen in FIG. 24C (the processing described is a process corresponding the second term of the right side of each of the expressions (3)).

Then, in the programmable video DSP 1, another command COM is issued to all of the PEs 5 to multiply the image data A to H stored in the directly preceding PEs 5 by 0.25 and add the products to the results of the processing stored in all of the PEs 5 as seen in FIG. 24D. Consequently, each of the PEs 5 multiplies the corresponding image data A to H by 0.25, adds the products to the image data obtained by multiplication by 0.5 in the preceding processing and stores the sums into the local memory 7 as seen in FIG. 24E (the processing described is a process corresponding to the first and second terms of the right side of each of the expressions (3)).

Further, in the programmable video DSP 1, another command COM is issued to all of the PEs 5 to multiply the image data A to H stored in the directly following PEs 5 by 0.25 and add the products to the results of the processing stored in all of the PEs 5 as seen in FIG. 24F. Consequently, each of the PEs 5 multiplies the corresponding image data A to H by 0.25, adds the products to the image data obtained by multiplication by 0.5 in the preceding processing and stores the sums into the local memory 7 as seen in FIG. 24G (the processing described is a process corresponding to the right side of each of the expressions (3)).

Consequently, the programmable video DSP 1 can process successive image data DV1 by repeating a series of processing steps of fetching the image data DV1 into the PEs 5, executing the predetermined processing, storing results of the processing into the local memories 7 of the PEs 5 and outputting the processing results when necessary.

Consequently, the programmable video DSP 1 serves as a low-pass filter for a horizontal direction if the successive input image data A to H are image data which appear successively in the horizontal direction. However, the programmable video DSP 1 serves as a low-pass filter for a vertical direction where the successive input image data A to H are image data which appear successively in the vertical direction.

In the programmable video DSP 1, where such PEs 5 are disposed for one line as seen in FIG. 25 so that image data are processed in a unit of one line, if an arithmetic operation process for one line is completed within a period of one scanning line, then the successive image data DV1 can be processed on the real time basis.

If the programmable video DSP 1 having such a high degree of universal use as described above can execute such processes as format conversion, enlargement or contraction of an image and so forth, then this eliminates the necessity for use of a device for exclusive use and can provide various advantages.

However, where a programmable video DSP of the type described wherein all PEs are controlled simultaneously and parallelly with a single command is applied to processes such as format conversion, enlargement or contraction of an image and so forth, there is a problem in that the processing is complicated and consequently image data cannot be processed on the real time basis.

For example, where the interpolation arithmetic operation processing according to the expressions (2) given hereinabove with reference to FIG. 19 is executed, since different arithmetic operation processes are applied to the output image data a, b, c, . . . , the programmable video DSP 1 successively performs the arithmetic operations for the output image data a, b, c, . . . as seen in FIGS. 26A to 26X.

In particular, in the programmable video DSP 1, the input image data A, B, C, . . . for one line are stored into the local memory 7 as seen in FIG. 26A, and dummy data is interposed at a predetermined interval so as to make the number of the input image data equal to the number of pixels of the output image data a, b, c, . . . and stores the input image data A, B, C, . . . for one line into the local memory 7.

Then, in the programmable video DSP 1, a command COM is issued to mask the other PEs 5 than the PE 5 corresponding to the output image data a and multiply the input image data A stored in the local memory 7 only of the PE 5 corresponding to the output image data a by the value 1 as seen in!FIG. 26B. Consequently, the image data A corresponding to the input image data a is multiplied by 1 and stored into the local memory 7 as seen in FIG. 26C (this is a process corresponding to the first expression of the expressions (2)). The programmable video DSP 1 thereby completes the arithmetic operation process for the output image data a.

After the arithmetic operation process for the output image data a is completed in this manner, the programmable video DSP 1 starts an arithmetic operation process for the output image data b. In particular, the programmable video DSP 1 issues a command COM to mask the PEs 5 other than the PE 5 corresponding to the output image data b and multiply the input image data B stored in the local memory 7 only of the PE 5 by the value 0.8 as seen in FIG. 26D. Consequently, the image data B corresponding to the input image data b is multiplied by 0.8 and resulting data is stored into the local memory 7 as seen in FIG. 26E (this is a process corresponding to the second term of the right side of the second expression of the expressions (2)).

Then, the programmable video DSP 1 similarly issues a command COM to mask the PEs 5 other than the PE 5 corresponding to the output image data b, multiply the input image data A stored in the PE 5 immediately preceding to the PE 5 by the value 0.2 and adds the product to the result of the processing stored in the PE 5 as seen in FIG. 26F. Consequently, the immediately preceding image data A is multiplied by 0.2 and resulting data is added to the image data 0.8B obtained and stored in the preceding process, and then the sum is stored into the local memory 7 as seen in FIG. 26G (this is a process corresponding to the right side of the second expression of the expressions (2)). The programmable video DSP 1 thereby completes the arithmetic operation process for the output image data B.

The programmable video DSP 1 successively executes such processes as described above for the output image data a, b, c, . . . as seen in FIGS. 26H and 26I. When the arithmetic operation process for all of the output image data a, b, c, . . . is completed, results of the arithmetic operation process for one line are stored in the local memory 7 as seen in FIG. 26X. Consequently, where the programmable video DSP 1 is applied to an interpolation arithmetic operation process, it is necessary to repeat much complicated processing, and much time is required for the arithmetic operation processing and real time processing cannot be anticipated. Further, also it cannot be avoided that the memory 9 which describes such a processing procedure as described above has a large capacity, and also the preparation operation for the program itself is complicated.

It is to be noted that, as described hereinabove with reference to FIG. 19, since the phase relationship between the input image data A, B, C, . . . and the output image data a, b, c, . . . is repeated in a predetermined period in such format conversion as described above, it is a possible idea to simplify the arithmetic operation process by modifying the setting of the mask so that, upon the arithmetic operation process for the output image data a, also the image data f which has the same phase relationship to the input image data as the output image data a is processed simultaneously. Even this simplified arithmetic operation processing, however, cannot solve the problem described above completely because the arithmetic operation process must be repeated for the successive:output image data after all. Further, in a process for enlargement or contraction at a fixed ratio, the periodical relationship between such input image data A, B, C, . . . and output image data a, b, c, . . . sometimes becomes a long period, and also the interpolation arithmetic operation process itself sometimes becomes complicated. In such an instance, further increased time is required.

Also it is a possible idea to use such a programmable video DSP 1 as described above such that image data which are adjacent in the vertical direction are stored into the PEs 5 and a weighted addition process between the image data adjacent in the vertical direction is performed to effect an interpolation arithmetic operation process in the vertical direction. Where the scheme just described above is employed, it is possible for the single programmable video DSP 1 to perform an interpolation arithmetic operation process for both of the horizontal direction and the vertical direction by allocating results of addition in the horizontal direction as the image data adjacent each other in the vertical direction which are to be stored into the PEs 5. It is to be noted that the single programmable video DSP 1 can execute an interpolation arithmetic operation process for the horizontal direction and the vertical direction similarly even if an interpolation arithmetic operation process for the vertical direction is performed first and then an interpolation arithmetic operation process for the horizontal direction is performed.

However, in such an interpolation arithmetic operation process for the vertical direction as described above, although the PEs use the same weighting coefficients to perform weighted arithmetic operation, since the weighting coefficients are different between different lines, different commands COM must be issued to the different lines. Consequently, it cannot be avoided to repeat complicated processing also for the vertical direction.

SUMMARY OF THE INVENTION

It is an object of the present invention to provide an interpolation processing apparatus, an interpolation processing method and an image display apparatus wherein processes such as format conversion can be executed by a comparatively simple process by a digital signal processor of the type wherein operations of all processor elements are controlled with one command.

In order to attain the object described above, according to the present invention, in a construction wherein operations of a plurality of element processors are controlled simultaneously and parallelly, the element processors are controlled so that they produce corresponding weighting coefficients based on number data allocated thereto thereby to allow such processes as format conversion to be executed by simpler processing than ever. Further, an interpolation process is performed using an arithmetic operation expression common to different lines wherein position information of the number of lines is used as a variable.

More specifically, according to an aspect of the present invention, there is provided an interpolation processing apparatus, comprising a plurality of element processors each for performing an arithmetic operation process of input data successively inputted thereto, and control means for commonly controlling the element processors so that the element processors individually perform a weighted addition process of the input data with predetermined weighting coefficients to effect interpolation processing for the input data, each of the element processors having a memory for temporarily storing at least data in the course of the arithmetic operation process, the memories having number data allocated thereto which individually correspond to sequential order numbers of the input data, the control means controlling the element processors to perform an arithmetic operation process based on the number data to produce the weighting coefficients which are to be used for the weighted addition process by the corresponding element processors.

According to another aspect of the present invention, there is provided an interpolation processing method wherein a plurality of element processors each for performing an arithmetic operation process of input data successively inputted thereto are commonly controlled by control means so that the element processors individually perform a weighted addition process of the input data with predetermined weighting coefficients to effect interpolation processing for the input data, the interpolation processing method controlling the control means to control the element processors to allocate, to memories individually provided in the element processors for temporarily storing at least data in the course of the arithmetic operation process, number data which individually correspond to sequential order numbers of the input data, execute an arithmetic operation process based on the allocated number data to produce the corresponding weighting coefficients, and execute a process of weighted addition with the produced weighting coefficients.

According to a further aspect of the present invention, there is provided an interpolation display apparatus, comprising a plurality of element processors each for performing an arithmetic operation process of input image data successively inputted thereto, control means for commonly controlling the element processors so that the element processors individually perform a weighted addition process of the input image data with predetermined weighting coefficients to effect interpolation processing for the input data to produce output image data, and a display screen for displaying the output image data of the control means, each of the element processors having a memory for temporarily storing at least data in the course of the arithmetic operation process, the memories having number data allocated thereto which individually correspond to sequential order numbers of the input image data, the control means controlling the element processors to perform an arithmetic operation process based on the number data to produce the weighting coefficients which are to be used for the weighted addition process by the corresponding element processors.

With the interpolation processing apparatus, interpolation processing method and image display apparatus, if the element processors produce individually corresponding weighting coefficients based on the number data allocated thereto, then it is possible to output the same command to all of the element processors so that the element processors may produce corresponding weighting coefficients simultaneously and parallelly. Consequently, such repetitive outputting of commands for the individual element processors as in the prior art can be prevented, and weighting coefficients can be set to the individual element processors with a command common to all of the element processors. Further, the same command can be issued to all of the element processors so that arithmetic operations of weighted addition can be executed simultaneously and parallelly with the weighting coefficients held by the element processors. Consequently, interpolation results by the weighted addition can be obtained by simple processing.

According to a still further aspect of the present invention, there is provided an interpolation processing apparatus which repetitively executes a first interpolation process in a horizontal direction or a vertical direction and a second interpolation process in a direction perpendicular to the direction of the first interpolation process to process image data, comprising a plurality of element processors each for performing an arithmetic operation process of successive ones of the image data, and control means for commonly controlling the element processors, each of the element processors having a memory for temporarily storing at least data in the course of the arithmetic operation process, each of the memories storing a plurality of ones of the image data which are adjacent in a horizontal direction or a vertical direction to each other, the control means controlling the element processors such that, in the first or second interpolation process, each of the element processors uses position information of that one of the image data which relates to an interpolation process as a variable to perform the interpolation arithmetic operation using an arithmetic operation expression same as those used by the other element processors.

According to a yet further aspect of the present invention, there is provided an interpolation processing method wherein a plurality of element processors each for performing an arithmetic operation process of input data successively inputted thereto are commonly controlled by control means so that a first interpolation process in a horizontal direction or a vertical direction and a second interpolation process in a direction perpendicular to the direction of the first interpolation process are repetitively performed to process the image data, the interpolation processing method controlling the control means to control the element processors to store a plurality of ones of the image data which are adjacent in a horizontal direction or a vertical direction to each other into a memory of each of the element processors, and use, in the first or second interpolation process, position information of that one of the image data which relates to an interpolation process as a variable to perform interpolation arithmetic operation using an arithmetic operation expression same as those used by the other element processors.

According to a yet further aspect of the present invention, there is provided an image display apparatus which repetitively executes a first interpolation process in a horizontal direction or a vertical direction and a second interpolation process in a direction perpendicular to the direction of the first interpolation process to process input image data to produce output image data and outputs the output image data to a display screen, comprising a plurality of element processors each for performing an arithmetic operation process of successive ones of the input image data, and control means for commonly controlling the element processors, each of the element processors having a memory for temporarily storing at least data in the course of the arithmetic operation process, each of the memories storing a plurality of ones of the image data which are adjacent in a horizontal direction or a vertical direction to each other, the control means controlling the element processors such that, in the first or second interpolation process, each of the element processors uses position information of that one of the image data which relates to an interpolation process as a variable to perform the interpolation arithmetic operation using an arithmetic operation expression same as those used by the other element processors.

With the interpolation processing apparatus, interpolation processing method and image display apparatus, the element processors are controlled so that they may perform interpolation arithmetic operations in accordance with the same arithmetic operation expression among the interpolation processes using the position information of image data which relates to an interpolation process as a variable. Consequently, where the interpolation process is, for example, an interpolation process for the vertical direction, interpolation process results can be obtained by the control common to the individual lines. Consequently, interpolation results can be obtained by simpler processing than ever.

BRIEF DESCRIPTION OF THE DRAWINGS

These and other objects and features of the present invention will become clear from the following description of the preferred embodiments given with reference to the accompanying drawings, in which:

FIGS. 1A to 1G are diagrammatic views illustrating an interpolation process, upon enlargement in a horizontal direction, of a programmable video DSP according to a first embodiment of the present invention;

FIG. 2 is a flowchart illustrating a general processing procedure of the programmable video DSP according to the first embodiment;

FIGS. 3A to 3X are diagrammatic views illustrating a numbering process of the programmable video DSP according to the first embodiment;

FIG. 17 is a block diagram showing a construction of an image processing apparatus according to a further embodiment of the present invention;

FIG. 18 is a characteristic diagram illustrating an interpolation function according to a bilinear approximate function;

FIG. 19 is a diagrammatic view illustrating a relationship between VGA image data and SVGA image data;

FIGS. 24A to 24G are diagrammatic views illustrating a filtering process of the programmable video DSP of FIG. 20;

FIGS. 26A to 26X are diagrammatic views illustrating format conversion of image data of the programmable video DSP of FIG. 20.

DETAILED DESCRIPTION OF THE PREFERRED EMBODIMENTS

Figure 4:
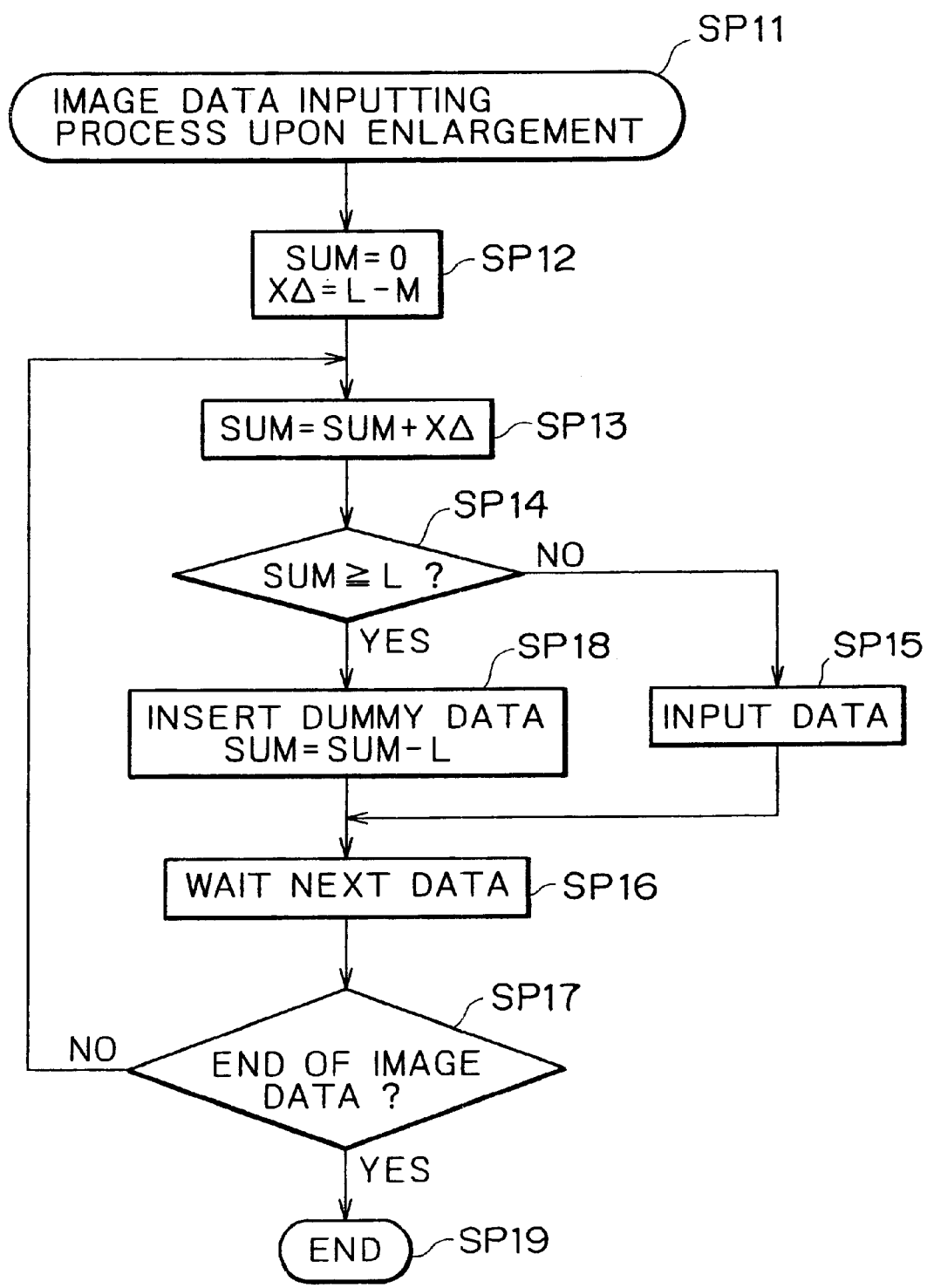
FIG. 4 is a flowchart illustrating a processing procedure of inserting dummy data.

1. First Embodiment
1-1. Construction of the First Embodiment
1-1-1. General Construction FIG. 2 is a flowchart illustrating a processing procedure of a controller of a programmable video DSP according to a first embodiment of the present invention. The programmable video DSP of the present embodiment is applied, for example, to an image display apparatus and performs an interpolation arithmetic operation process using an interpolation function in the form of a bilinear approximate function to convert input image data so that they may have a format suitable for display.

It is to be noted that the programmable video DSP in the present embodiment has the same construction as the programmable video DSP 1 described hereinabove with reference to FIG. 20 except that the construction of the control system is different. Therefore, those components which are different from the components of the conventional programmable video DSP 1 are denoted by reference characters in parentheses in FIG. 20 and the present embodiment is described with reference to FIG. 20.

Figure 20:
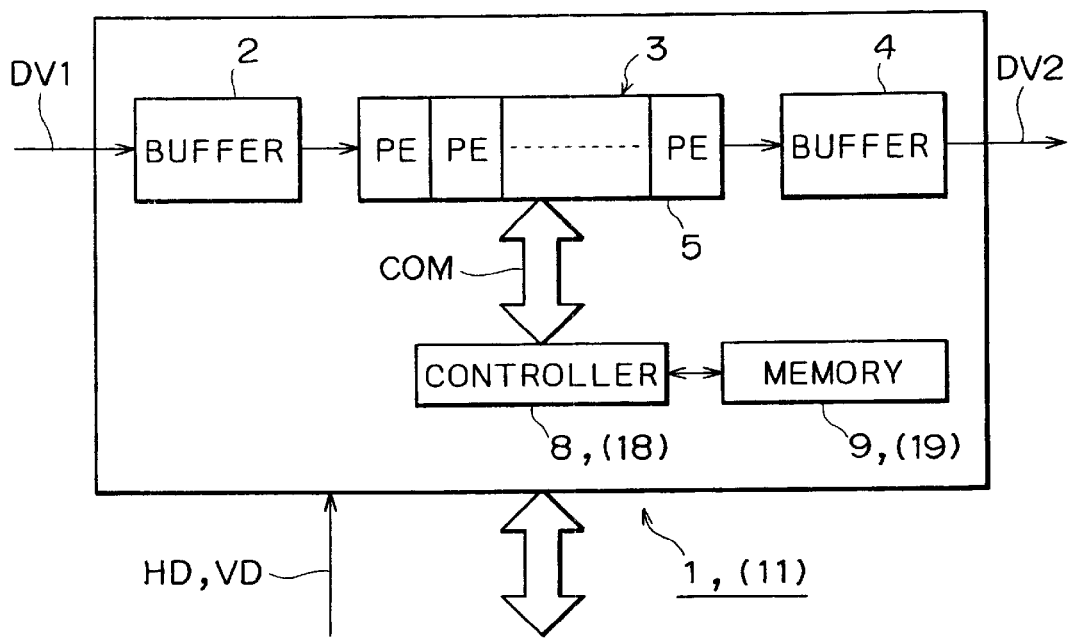
FIG. 20 is a block diagram showing a construction of a programmable video DSP.
Figure 21:
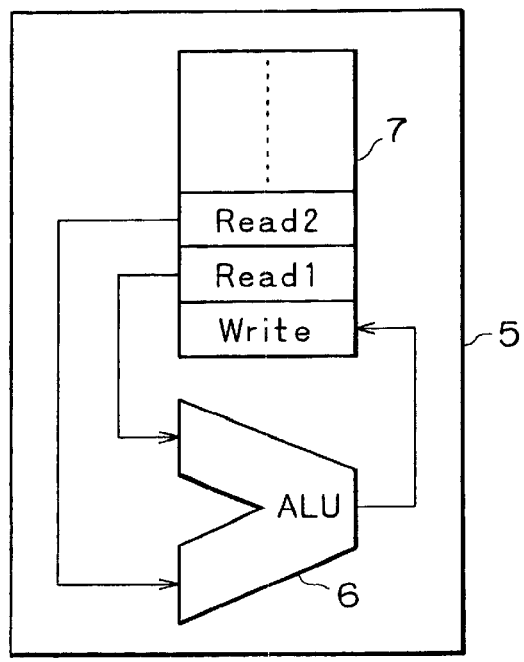
FIG. 21 is a block diagram showing a construction of a programmable element of the programmable video DSP of FIG. 20.
Figure 22:
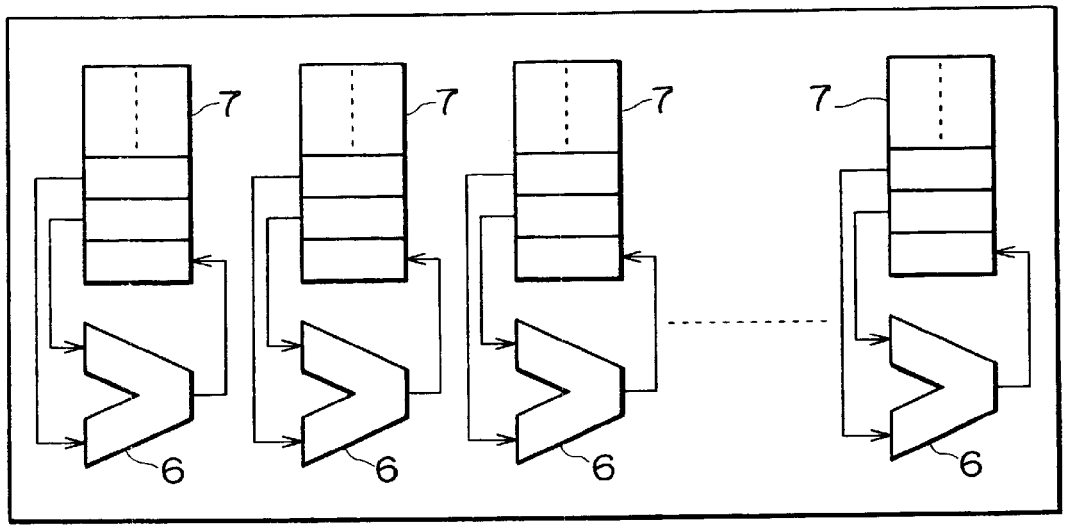
FIG. 22 is a block diagram showing a modeled form of the programmable video DSP of FIG. 20.
Figure 23:
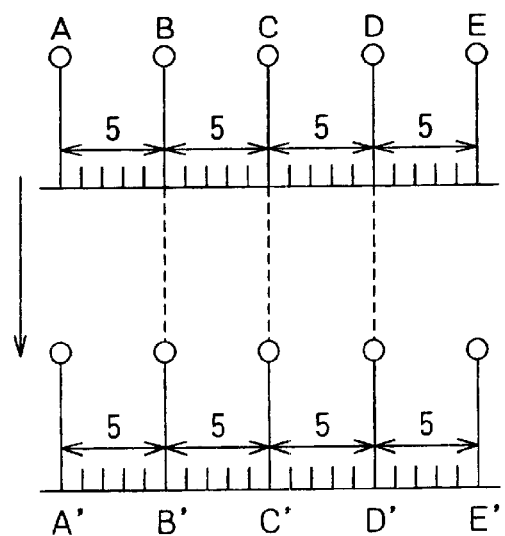
FIG. 23 is a diagrammatic view illustrating a relationship between input image data and output image data upon filtering.
Figure 25:
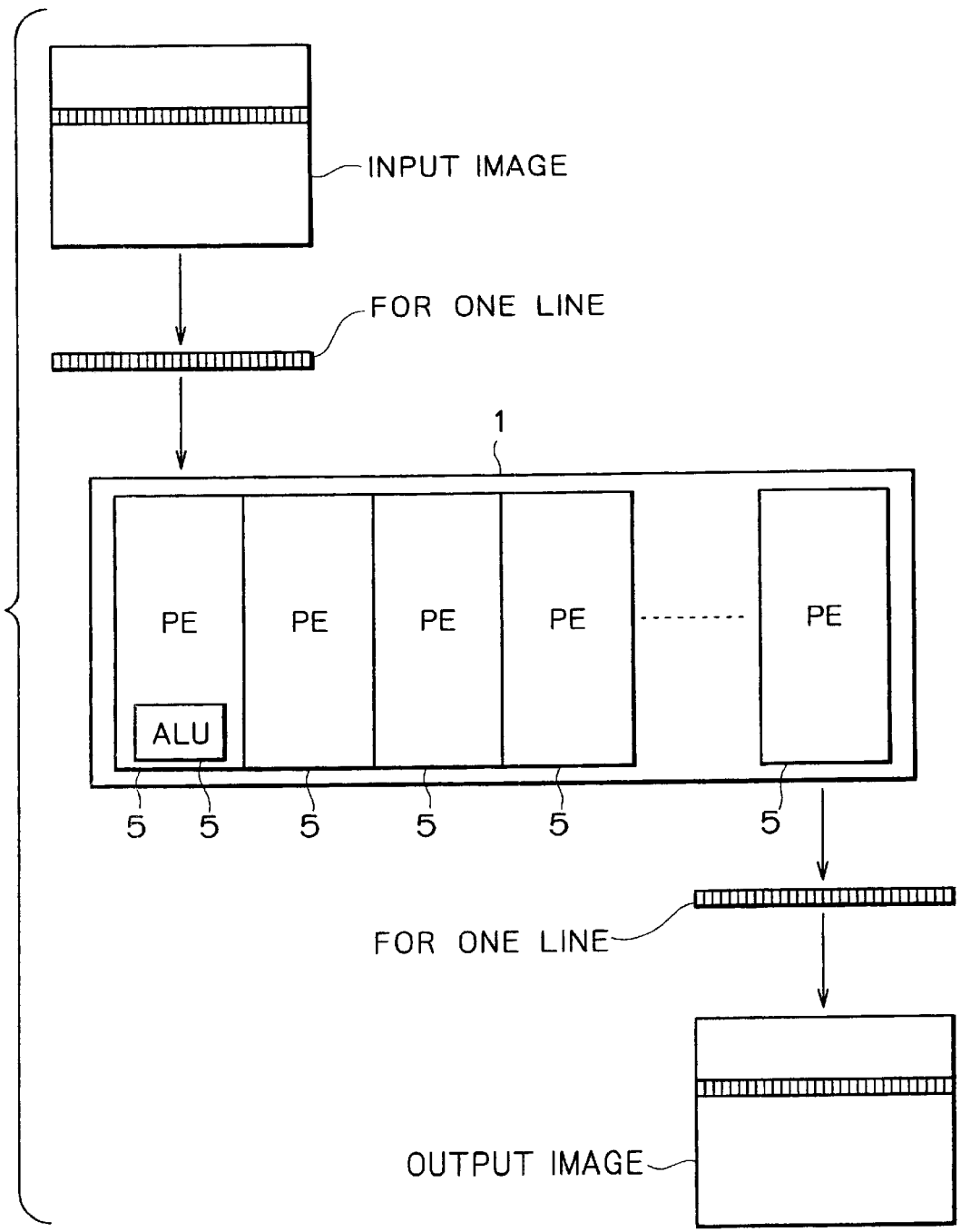
FIG. 25 is a diagrammatic view illustrating an interpolation process of image data by the programmable video DSP of FIG. 20.

The programmable video DSP 11 shown in FIG. 20 includes a number of PEs 5 greater than the number of pixels for one line of input image data DV1 and greater than the number of pixels for one line of output image data DV2. The PEs 5 for one line form element processors which successively record input data into the local memories 7, store data during the course of processing and results of processing into the local memories 7 and perform an arithmetic operation process of the input data successively inputted in this manner.

The controller 18 forms control means for issuing a command to the PEs 5 to commonly control the PEs 5. The controller 18 executes the process illustrated in FIG. 2 in accordance with a processing procedure loaded into the memory 19 from a controller of the image display apparatus not shown. In particular, if power supply is made available, then the controller 18 is reset from the controller of the image display apparatus, and the processing of the controller 18 advances from step SP1 to step SP2, in which the controller 18 resets all of the PEs 5. In particular, the controller 18 resets contents of the local memories 7 of all of the PEs 5 to the value 0.

Then, the processing advances to step SP3, in which the controller 18 executes a numbering process for the PEs 5. The numbering process for the PEs 5 here is a process of successively allocating numbers to the successive PEs 5 in accordance with an order corresponding to the arrangement of the input image data DV1 and recording the numbers into the local memories 7 of the individual PEs 5.

Since the contents of the local memories 7 of all of the PEs 5 are set to the value 0 by the resetting process in step SP2 as seen in FIG. 3A, the controller 18 outputs a command to all of the PEs 5 to add the value 1 to the contents stored in the individually preceding PEs 5 and record the sums as seen in FIG. 3B. In the present process, since no preceding PE 5 to the PE 5 in the first stage (the PE at the left end in FIG. 3B) is present, the PE 5 executes a process of adding the value 1 to the value 0.

Then, the controller 18 similarly outputs a command to all of the PEs 5 to add the value 1 to the contents stored in the individually preceding PEs 5 and record the sums as seen in FIG. 3C. Consequently, the value 1 is recorded into the local memory 7 of the PE 5 in the first stage while the value 2 is recorded into the local memories 7 of the following PEs 5.

The controller 18 repeats the command by a number of times equal to the number of PEs 5 (FIGS. 3D, . . . , 3X). Consequently, the numbers which successively increase by one from the first stage side are successively allocated to the PEs 5 and recorded into the local memories 7 of the individual PEs 5. It is to be noted that, in the following description, the numbers are referred to as PE numbers.

Then, the processing advances to step SP4, in which the controller 18 executes a preparatory arithmetic operation process. In the preparatory arithmetic operation process, the controller 18 produces weighting coefficients, which are required for an interpolation arithmetic operation process for a horizontal direction which is hereinafter described, in the individual PEs 5 and executes a division process for calculating weighting coefficients necessary for an interpolation arithmetic operation process for a vertical direction. Further, in a process for enlargement by which the number of pixels of the image data DV1 is increased, the controller 18 executes in advance part of calculation of timings at which dummy data is to be inserted in a process for a horizontal direction and part of calculation of timings at which dummy data is to be inserted in a process for a vertical direction. On the contrary, in a process for reduction by which the number of pixels of image data DV1 is reduced, the controller 18 executes part of calculation of timings at which image data are to be sampled out and outputted in a process for a horizontal direction and part of calculation of timings at which image data are to be sampled out and outputted in a process for a vertical direction in advance as hereinafter described.

Consequently, the programmable video DSP 11 can make effective use of a vertical synchronization period which has a sufficient room in time to execute such processes as described above so that a sufficient time is allocated to an arithmetic actual operation process of image data DV1 as much to allow the image data DV1 to be processed on the real time basis.

Then, the processing advances to step SP5, in which the controller 18 executes an interpolation arithmetic operation process for a horizontal direction for one line of a horizontal direction in accordance with a processing procedure which is hereinafter described.

Thereafter, the processing advances to step SP6, in which the controller 18 discriminates whether or not the interpolation arithmetic operation process for the horizontal direction is completed for a number of lines necessary for an interpolation arithmetic operation process for a vertical direction. Here, if a negative result is obtained in step SP6 then the processing advances to step SP5. On the contrary, if a affirmative result is obtained in step SP6, then the processing advances to step SP7, in which an interpolation arithmetic operation process for a vertical direction for one line is executed using results of the interpolation arithmetic operation process for the horizontal direction stored in the PEs 5.

Consequently, in the present embodiment, the single programmable video DSP 11 converts the number of pixels for both of the vertical direction and the horizontal direction.

After the interpolation arithmetic operation process for the vertical direction for one line is completed in this manner, the controller 18 advances its processing to step SP8, in which it discriminates whether or not the processing for one screen is completed. Here, if a negative result is obtained, then the processing returns to step SP5 so that the interpolation arithmetic operation process for the horizontal direction for the next one line is executed.

On the other hand, if an affirmative result is obtained in step SP8, then the controller 18 advances its processing to step SP9, in which it discriminates whether or not the processing for a next one screen is required. If an affirmative result is obtained, then the processing returns to step SP4 so that the controller 18 repeats the processing described above. However, if a negative result is obtained, then the processing advances to step SP10, in which the controller 18 ends the processing procedure.

FIG. 4 is a flowchart illustrating an image data inputting processing procedure for loading input image data DV1 into the PEs 5. When an interpolation arithmetic operation process wherein the number of pixels of image data DV1 is increased and resulting data are outputted (a process for enlargement) is to be performed for the horizontal direction, the controller 18 firstly executes the processing procedure of FIG. 4 in the interpolation arithmetic operation process for the horizontal direction and loads resulting input image data DV1 to the PEs 5.

In particular, the processing advances from step SP11 to step SP12, in which the controller 18 resets a variable SUM to the value 0. Here, the variable SUM is a variable used for calculation of a timing at which dummy data is to be inserted. The controller 18 calculates, based on an integer ratio M:L obtained by dividing the number of pixels m for the horizontal direction before conversion and the number of pixel 1 for the horizontal direction after conversion by the greatest common divisor, a difference value $X\Delta = L-M$ between the integer values M and L which form the integer ratio M:L. It is to be noted that the integer ratio M:L is given as an enlargement ratio $r=L/M$.

Figure 5:
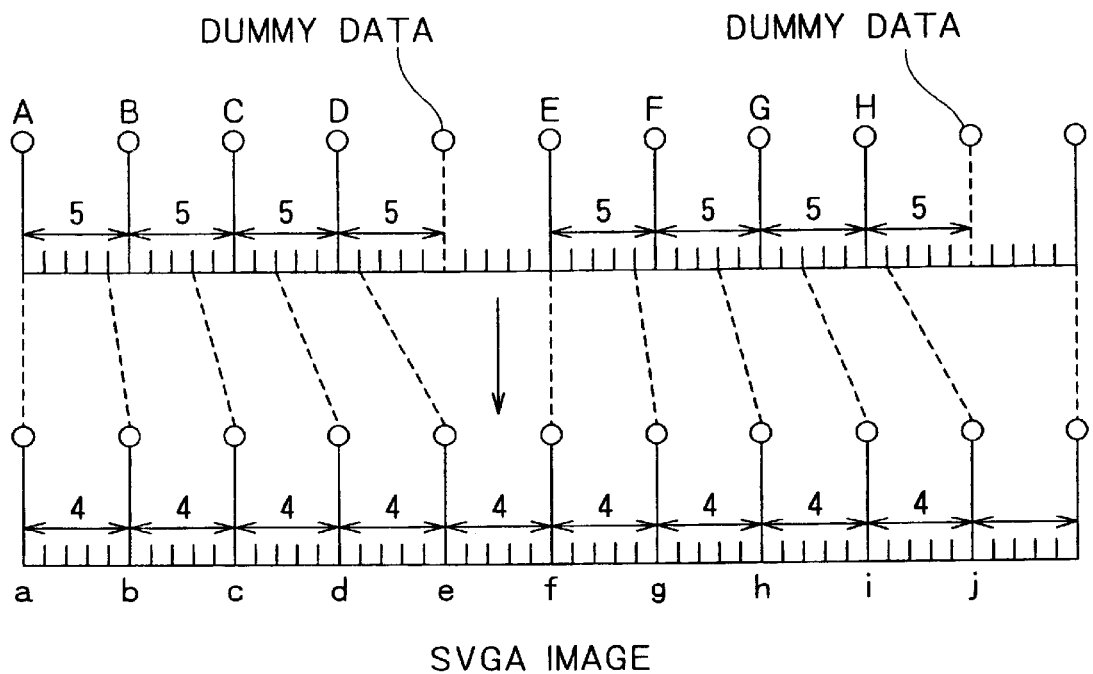
FIG. 5 is a diagrammatic view illustrating a relationship between input image data and output image data upon enlargement.
Figure 6:
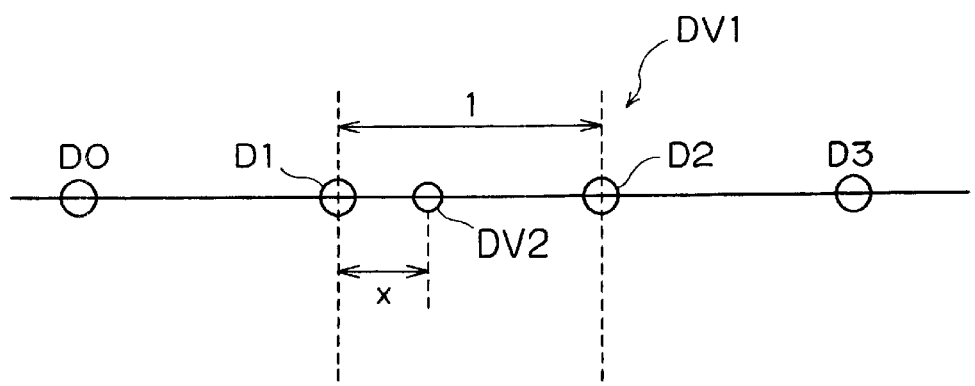
FIG. 6 is a diagrammatic view illustrating a phase x.

From the foregoing, in format conversion from image data DV1 of the VGA which include 640 pixels in the horizontal direction into output image data DV2 of the SVGA which include 800 pixels in the horizontal direction as seen in FIG. 5, the enlargement ratio $r=5/4$ is obtained, and the value 1 is obtained as the difference value $X\Delta$. It is to be noted that, in FIG. 5, a corresponding relationship between input and output image data is indicated by broken lines.

Then, the controller 18 advances its processing to step SP13, in which it adds the difference value $X\Delta$ to the variable SUM to update the variable SUM. Thereafter, the controller 18 advances its processing to step SP14, in which it is discriminated whether or not the value of the variable SUM updated in step SP13 is higher than the value of the integer ratio M:L on the output image data DV2 side.

If a negative result is obtained, then the controller 18 advances its processing to step SP15, in which it inputs the input image data DV1 to the top one of the PE 5, and then to step SP16. In step SP16, the controller 18 waits next input image data DV1 to be inputted, and then in next step S17, the controller 18 discriminates whether or not inputting of the input image data DV1 for one line is completed. Here, if a negative result is obtained, then the processing of the controller 18 advances to step SP13.

Consequently, the controller 18 successively records the image data DV1 inputted successively thereto into the successive ones of the PEs 5 until the variable SUM exceeds an integral number of times the integer value M while successively incrementing the variable SUM by an amount-equal to the difference value $X\Delta$ between the integer values M and L which form the integer ratio M:L of pixel values before and after the conversion.

If the variable SUM exceeds the integer value M as a result of such incrementing of the variable SUM in this manner, then an affirmative result is obtained in step SP14, and consequently, the processing advances from step SP14 to step SP18, in which dummy data is recorded into corresponding one of the PEs 5 and then the integer value L is subtracted from the variable SUM.

Consequently, the controller 18 successively accumulates the difference value $X\Delta$ of the pixel values represented by the integer ratio M:L for each input image data DV1 and sets the timing at which the variable SUM which is the thus accumulated value exceeds a value equal to an integral number of times the integer value L on the output image data DV2 side as a timing at which dummy data is to be inserted. Consequently, when the input image data DV1 of the VGA are to be converted in format into output image data DV2 of the SVGA, the controller 18 interposes dummy data in a period of 4 pixels as seen in FIG. 4 so that, for the convenience of calculation, the number of pixels of the input image data DV1 may be equal to the number of pixels of the output image data DV2 thereby to make it possible to successively output results of the arithmetic operation process of the successive PEs 5 so that the image data DV2 of the intended number of pixels may be outputted.

In this instance, in the present embodiment, dummy data is interposed at a timing corresponding to the weighting coefficient of the value 0 so that an arithmetic operation process can be executed in accordance with a generalized weighting arithmetic operation expression which is hereinafter described. Consequently, a weighting arithmetic operation process can be performed by simple processing.

Thus, in a process for enlargement, the controller 18 inputs image data DV1 for one line while inserting dummy data in accordance with an enlargement ratio in this manner. Then, when this inputting is completed, since an affirmative result is obtained in step SP17, the processing advances from step SP17 to step SP19, in which the present processing procedure is ended.

It is to be noted that, in the present embodiment, since the dummy data is not used for production of the image data DV2 at all, data suitable for the arithmetic operation process is used, and according to circumstances, the data of the value 0 set by the processing in step SP2 of FIG. 2 is held as it is.

Further, as described hereinabove in connection with step SP4 of FIG. 2, initialization of the variable SUM and calculation of the difference value $X\Delta$ which are part of calculation of a timing at which the dummy data is to be inserted are executed within a vertical synchronization period of the image data DV1.

On the other hand, in a process for reduction, the controller 18 successively stores input image data DV1 for one line successively inputted thereto into the successive ones of the PEs 5 without inserting dummy data at all.

1-1-2. Interpolation Arithmetic Operation Process for the Horizontal Direction

After the input image data DV1 for one line are stored into the PEs 5 in this manner, the controller 18 successively issues commands COM to execute an interpolation arithmetic operation process for the horizontal direction. Here, the pixel interval of the input image data DV1 (D0, D1, D2, D2) which are successively inputted at predetermined pixel intervals is set to the value 1 by normalization and the phase of the output image data DV2 with respect to the immediately preceding input image data DV1 (in this instance, the input image data D1) is placed as the value x. It is to be noted that, where an interpolation function according to a bilinear approximate function is applied, since the value of the phase x represented in a normalized form in this manner is allocated as it is to the weighting coefficients in accordance with the expressions (2), in the following description, x is suitably called phase or weighting coefficient.

In a weighted addition process of the type described, as described hereinabove in connection with the expressions (2), although different arithmetic operation expressions are used in accordance with the phase x of the output image data DV2 with respect to the input image data DV1, they can be generalized using the phase x.

For example, in the interpolation arithmetic operation process of converting image data of the VGA into image data of the SVGA using the bilinear proximate function described hereinabove in connection with the expressions (2), the arithmetic operation expressions can be generalized as seen from the following expression:

$$DN = DATA1 \times x + DATA2 \times (1-x) \qquad (4)$$

where DATA1 and DATA2 are input image data DV1 and dummy data which correspond to the pixels immediately preceding and following the object pixel DN of the output image data DV2.

Specifically, where the expression (4) is represented in contrast with the expressions (2), it can be represented in the following manner:

$$a = 0 + 1 \times A(1-x) = 1$$

$$b = \tfrac{1}{5} \times A + \tfrac{4}{5} \times B(1-x) = \tfrac{4}{5}$$

$$c = \tfrac{2}{5} \times B + \tfrac{3}{5} \times C(1-x) = \tfrac{3}{5}$$

$$d = \tfrac{3}{5} \times C + \tfrac{2}{5} \times D(1-x) = \tfrac{2}{5}$$

$$e = \tfrac{4}{5} \times D + \tfrac{1}{5} \times E(1-x) = \tfrac{1}{5}$$

$$f = 0 + 1 \times E(1-x) = 1 \qquad (5)$$

It is to be noted that the term of the value 0 on the right side of each of the first and fifth expressions in the expressions (5) is a term weighted with the value 0.

Consequently, in the present embodiment, the controller 18 issues a command COM so that the PEs 5 side may produce weighting coefficients by the arithmetic operation process using the PE numbers so that all of the PEs 5 may perform an arithmetic operation process simultaneously and parallelly with the single command COM. Thus, even where different weighting coefficients are used by the PEs, the weighting coefficients can be produced with the same command by the individual PEs 5. As a result, the interpolation arithmetic operation process can be performed by simple arithmetic operation processing.

Further, in this instance, the input image data held by the immediately preceding PEs 5 are transferred to the rear stage side when necessary so that input image data DATA1 and DATA2 allocated to the interpolation arithmetic operation expressions represented by the expression (4) and so forth may be recorded into the PEs 5. Consequently, for example, where the interpolation arithmetic operation process based on a bilinear approximate function is to be performed, input image data of two successive pixels are stored into each of the PEs 5.

In particular, when a conversion process of image data of the VGA into image data of the SVGA is to be performed using a bilinear approximate function, the controller 18 issues a command COM to all of the PEs 5 so that the input image data DV1 held in the immediately preceding PEs 5 may be stored into the local memory 7. Consequently, the controller 18 stores DATA1 and DATA2 represented by the expression (4) into the local memory 7 of each of the PEs 5 as seen from FIGS. 7 and 8.

Then, the controller 18 sets weighting coefficients to the local memory 7. Here, the controller 18 issues a series of commands COM so that each of the PEs 5 may execute an arithmetic operation process represented by the following expression:

$$x = \frac{amari}{L} \qquad (6)$$

where amari is a variable represented by the following expression:

$$amari = \mathrm{mod}\left(PENO \times \frac{(L-M)}{L}\right) \qquad (7)$$

Since the weighting coefficients obtained by the arithmetic operation process of the expression (6) are common among the PEs 5 even if the line changes, the controller 18 issues the commands COM to the PEs 5 in a period having a sufficient margin in time so that the arithmetic operation process of the expression (6) may be executed. More particularly, as described hereinabove in connection with step SP2 of FIG. 2, when the successive image data DV1 are to be processed, each of the PEs 5 executes the arithmetic operation process of the expression (6) within a vertical synchronization period of the image data DV1. Consequently, even where an image is to be enlarged gradually in a unit of a frame, the controller 18 can perform this process on the real time basis.

Thus, in the interpolation arithmetic operation process of converting image data of the VGA into image data of the SVGA using a bilinear approximate function described hereinabove, the value $\tfrac{1}{5}$ can be obtained as (L−M)/L.

In this instance, the controller 18 outputs a command COM (FIGS. 1A and 1B) so that the value $\tfrac{1}{5}$ calculated in the manner may be used to calculate the variable amari as seen from FIGS. 1A to 1G. Further, the controller 18 issues a command COM to all of the PEs 5 so that each of them may use the variable amari obtained in this manner to execute an arithmetic operation process of the expression (6) (FIGS. 1C and 1D). In this instance, since (L−M)/L in the expression (7) represents a phase difference of one pixel between input and output image data where the pixel interval of the input image data DV1 is represented in a normalized form, each of the PEs 5 uses the PE number PENO to accumulate phase differences between input and output image data and calculates the phase x by remainder calculation in which the integer value L of the output image data side is set as the base. The controller 18 sets the phases x (weighting coefficients) calculated in this manner to the individual PEs 5 (FIG. 1E).

Further, the controller 18 issues a command COM to all of the PEs 5 so that each of the PEs 5 may execute an arithmetic operation process of (1−x) using the phase x set to the PE in this manner (FIGS. 1D and 1F). Consequently, the weighting coefficients x and (1−x) are set to the individual PEs 5 (FIG. 1G).

After the weighting coefficients x and (1−x) are set to the PEs 5 in this manner, the controller 18 issues a command COM to all of the PEs 5 so that each of them may execute an arithmetic operation process of the expression (4). Consequently, results of the interpolation arithmetic operation process for the horizontal direction are accumulated in the individual PEs 5.

On the other hand, where the process for the horizontal direction is a process for reduction wherein the number of pixels is reduced, the enlargement ratio r (L/M) has a value lower than the value 1. The controller 18 executes similar processing replacing the values L and M of the denominator and the numerator of the expression (7). Further, the controller 18 issues a command so that the image data DV1 may be allocated to the weighting coefficients accumulated in the PEs 5 conversely to the allocation in the case of the arithmetic operation process upon enlargement. Consequently, results of the interpolation arithmetic operation for the reduction processing are accumulated in the local memories 7 of the PEs 5.

Figures 9, 10:
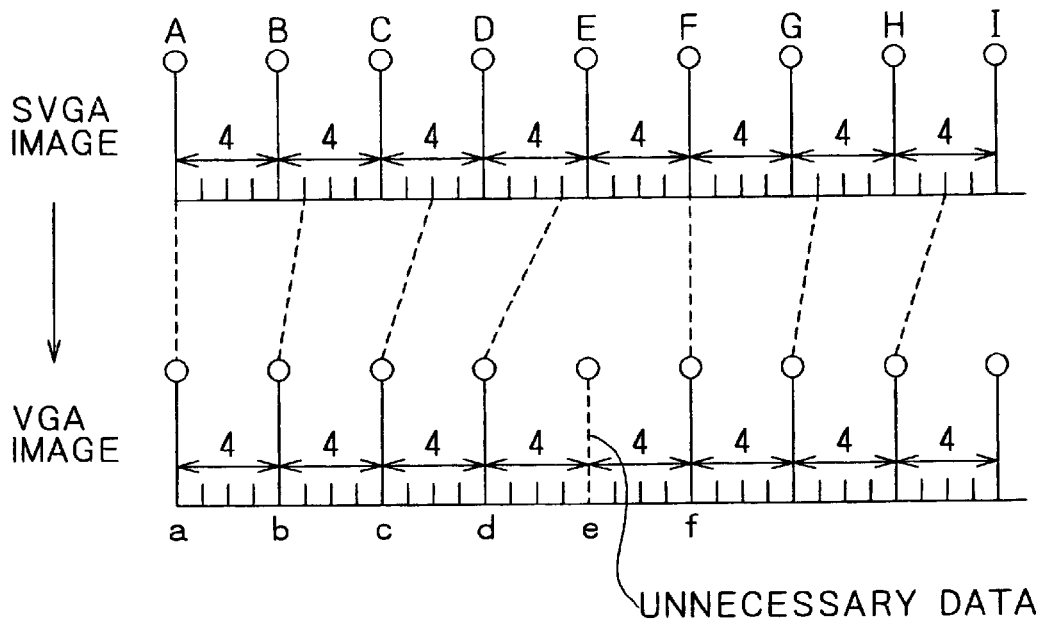
FIG. 9 is a diagrammatic view illustrating a relationship between input image data and output image data upon reduction.
FIG. 10 is a table illustrating a relationship between image data and weighting coefficients in the interpolation arithmetic operation process for a horizontal direction of FIG. 9.

In particular, even in the reduction, the expressions for the weighted arithmetic operation process for production of the individual output image data DV2 can be represented by a generalized expression using the phase x. This is described taking conversion of input image data DV1 of the SVGA into output image data DV2 of the VGA with a bilinear approximate function as seen in FIG. 9 as an example. In this instance, the output image data a, b, c, . . . can be represented by the following expressions:

$$a = 1 \times A$$
$$b = \tfrac{3}{4} \times B + \tfrac{1}{4} \times C$$
$$c = \tfrac{2}{4} \times C + \tfrac{2}{4} \times D$$
$$d = \tfrac{1}{4} \times D + \tfrac{3}{4} \times E$$
$$e = 0 + 0 \qquad (8)$$

If the expressions (8) are represented using the phase x, they can be represented by the following expressions:

$$a = 1 \times A + 0(1-x) = 1$$
$$b = \tfrac{3}{4} \times B + \tfrac{1}{4} \times C(1-x) = \tfrac{3}{4}$$
$$c = \tfrac{2}{4} \times C + \tfrac{2}{4} \times D(1-x) = \tfrac{2}{4}$$
$$d = \tfrac{1}{4} \times D + \tfrac{3}{4} \times E(1-x) = \tfrac{1}{4}$$
$$e = 0 + 0(1-x) = 1 \qquad (9)$$

Consequently, also in the process for reduction, although contents of the interpolation arithmetic operation are different among different pixels of the output image data DV2, the following expression can be obtained by replacing the image data DV1 in the expression (4) as in the case of the process for enlargement:

$$DN = DATA2 \times x + DATA1 \times (1-x) \qquad (10)$$

Figures 7, 8:
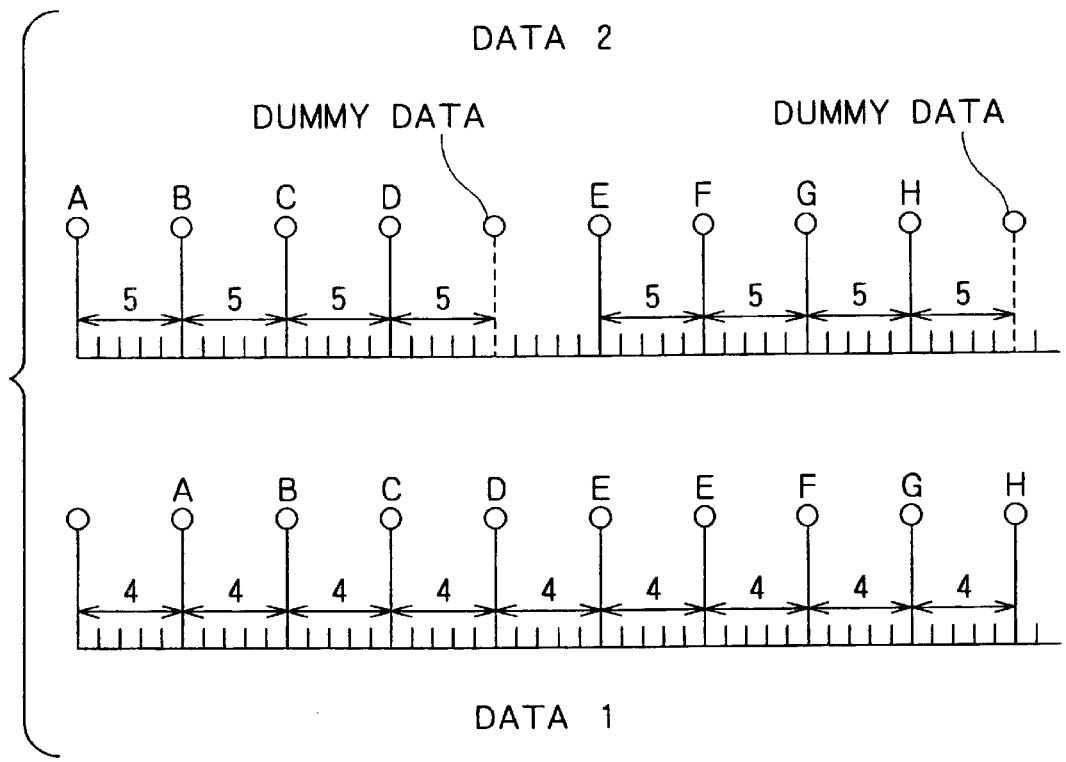
FIG. 7 is a diagrammatic view illustrating data using in an interpolation arithmetic operation process for a horizontal direction.
FIG. 8 is a table illustrating a relationship between image data and weighting coefficients in the interpolation arithmetic operation process for a horizontal direction of FIG. 7.

It is to be noted that this relationship is illustrated in FIG. 10 in contrast with FIG. 8.

Consequently, similarly as in the enlargement process, the controller 18 sets the weighting coefficients x and (1−x) to each of the PEs 5 in accordance with the following expressions for an arithmetic operation process represented in contrast with the expressions (6) and (7):

$$x = \frac{amari}{L} \left( \frac{amari}{L} < 1 \right)$$
$$x = 0 \left( \frac{amari}{L} \geq 1 \right) \qquad (11)$$
$$amari = \mathrm{mod}\left( PENO \times \frac{(M-L)}{M} \right) \qquad (12)$$

Figure 11:
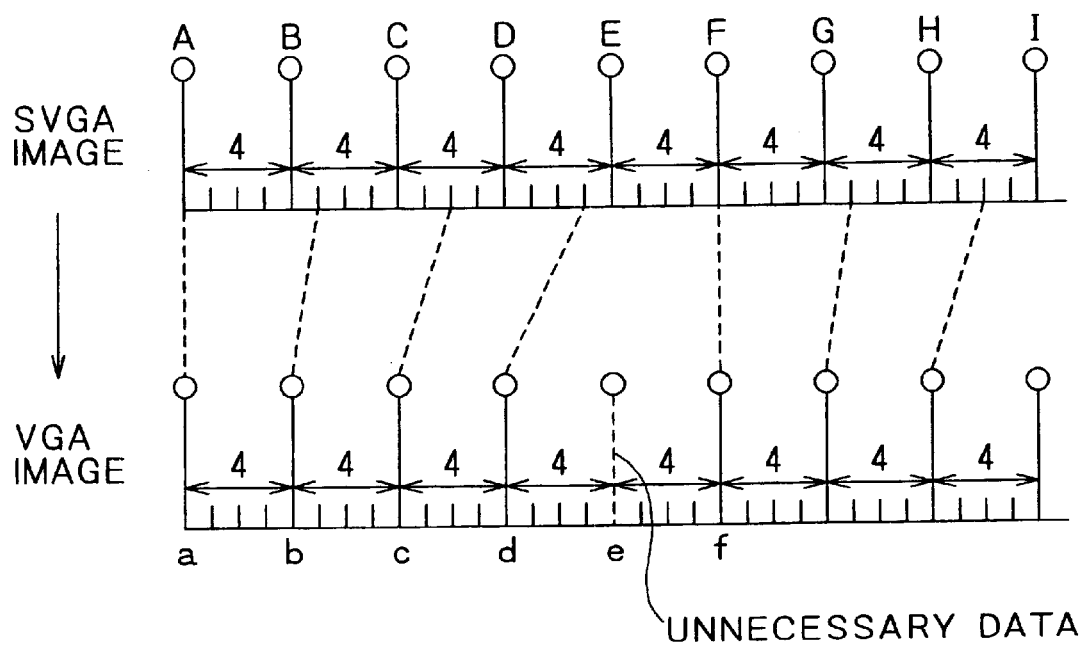
FIG. 11 is a diagrammatic view illustrating unnecessary data in the interpolation arithmetic operation process for a horizontal direction of FIG. 9.

It is to be noted that, if the process for reduction is executed for the horizontal direction in this manner, then a wasteful interpolation arithmetic operation process result (hereinafter referred to as unnecessary data) which does not form the output image data DV2 is accumulated as seen in FIG. 11. Consequently, in the reproduction process, the controller 18 first performs an arithmetic operation process so that arithmetic operation results corresponding to dummy data interposed in the input image data DV1 may be interposed in the output image data DV2 and then processes the unnecessary data by a sampling out process which is hereinafter described.

In this instance, the second expression of the expressions (11) represents a weighting coefficient corresponding to the unnecessary data. Consequently, in the process of the second expression of the expressions (11), when necessary, the first expression may be applied to simplify the processing as much.

1-1-3. Interpolation Arithmetic Operation Process for the Vertical Direction

After the interpolation process for the horizontal direction is executed in this manner so that a number of interpolation arithmetic operation results for the horizontal direction equal to the number of lines necessary for an interpolation arithmetic operation process for the vertical direction are accumulated in the PEs 5, the controller 18 executes the interpolation arithmetic operation process for the vertical direction described hereinabove with reference to step S6.

In particular, in the process for enlargement, the controller 18 counts the number of lines for the vertical direction of the input image data DV1 by means of a line counter, and forms, based on the count value, a relationship between image data A, B, C, . . . and output image data a, b, c, . . . as described hereinabove with reference to FIG. 5 in each of the PEs 5 also for the vertical direction. It is to be noted that, in the process for the vertical direction, the image data A, B, C, . . . are results of the interpolation process for each line in the horizontal direction.

In particular, when image data of the VGA are to be converted in format into image data of the SVGA, the controller 18 loads dummy data for one line into the PEs 5 by a processing procedure similar to that of FIG. 4 each time interpolation results A, B, C, . . . for the horizontal direction are obtained for four lines. The controller 18 performs initialization of the variable SUM and calculation of the difference value XΔ, which are part of calculation of a timing at which the dummy data is to be loaded, within a vertical synchronization period of the image data DV1 as described hereinabove in connection with step SP4 of FIG. 2.

Further, after a number of results of the interpolation arithmetic operation process for the horizontal direction equal to the number of lines necessary to execute the interpolation arithmetic operation process for the vertical direction for one line are accumulated, the controller 18 calculates a weighting coefficient for the line with respect to the counter value of the line counter and performs a weighted addition process with the weighting coefficient.

More particularly, in the interpolation process for the vertical direction in which a bilinear approximate function is used, image data for one line can be produced from image data for 2 lines including a line to which dummy data is allocated as represented by the expression (4), and if interpolation process results for the horizontal direction for one line are accumulated in the PEs 5, then image data for one line can be produced from the interpolation process results and interpolation process results for the immediately preceding line as seen in FIG. 5.

Consequently, each time the controller 18 executes the interpolation arithmetic operation process for the horizontal direction for one line, it calculates the weighting coefficient x by an arithmetic operation process of the following expression:

$$Yamari = \text{mod}\left(LCT \times \frac{(L-M)}{L}\right) \quad (13)$$

$$x = \frac{Yamari}{L} \quad (14)$$

where LCT is the count value of the line counter, and Yamari is a variable used in the process for the vertical direction corresponding to the variable amari described hereinabove. The controller 18 uses the phase x obtained in this manner (since the interpolation function is a bilinear approximate function, the phase x is one of a set of weighting coefficients) to produce interpolation arithmetic operation results for the vertical direction in the PEs 5 by an arithmetic operation process of the expression (4) in which successive interpolation arithmetic operation results for the horizontal direction stored in each of the PEs 5 are placed as DATA1 and DATA2.

In this instance, the controller 18 produces the weighting coefficients x using the arithmetic operation expressions common to the different lines which are represented by the expressions (13) and (14) wherein the count value of the line counter which is position information of the input image data DV1 is used as a variable. Further, the controller 18 uses the weighting coefficient x to produce another weighting coefficient (1−x) and uses the weighting coefficients x and (1−x) to execute a process of interpolation arithmetic operation in each of the PEs 5 in accordance with the arithmetic operation expression same as that for the horizontal direction.

Consequently, even where the coefficients x and (1−x) are different between different lines, the controller 18 calculates the weighting coefficients x and (1−x) using the same arithmetic operation expression and further executes a weighted addition process using the same arithmetic operation expression. Consequently, the controller 18 can execute the interpolation process for the vertical direction by simpler processing than that in the conventional process.

It is to be noted that the controller 18 executes the arithmetic operation process of (L−M)/L in the expression (13), which is a dividing process necessary for production of the weighting coefficient, within a vertical synchronization period as described hereinabove in connection with step SP4 of FIG. 2.

On the other hand, in a process for reduction similarly as upon enlargement, the controller 18 counts the number of lines by means of the line counter and forms a relationship between image data A, B, C, . . . and output image data a, b, c, . . . in the PEs 5 as described hereinabove with reference to FIG. 11 also for the vertical direction with reference to the count value. It is to be noted that, in the process for the vertical direction, the image data A, B, C, . . . are interpolation process results for the horizontal direction. In this instance, the insertion of dummy data in a unit of a line executed in the process for enlargement is omitted.

In particular, when the controller 18 performs format conversion of image data of the VGA into image data of the SVGA, if interpolation arithmetic operation results for the horizontal direction are accumulated for a number of lines necessary for execution of the interpolation arithmetic operation process for the vertical direction for one line in the PEs 5, a weighting coefficient for this line is calculated with reference to the count value of the line counter, and a weighted addition process is performed using the weighting coefficient.

More particularly, in an interpolation process for the vertical direction in which a bilinear approximate function is used, image data for one line can be produced from image data for two lines as seen from the expression (10), and if results of the interpolation process for one line for the horizontal direction are accumulated, then image data for one line can be produced from the results of the interpolation process and results of the interpolation process for the immediately preceding line as seen in FIG. 11.

Consequently, each time the controller 18 executes the interpolation arithmetic operation process for the horizontal direction for one line, it calculates the weighting coefficient x by an arithmetic operation process of the following expressions:

$$Yamari = \text{mod}\left(LCT \times \frac{(M-L)}{M}\right) \quad (15)$$

$$x = \frac{Yamari}{L} \quad \left(\frac{Yamari}{L} < 1\right)$$

$$x = 0 \ (1-x) = 0 \ \left(\frac{Yamari}{L} \geq 1\right) \quad (16)$$

The controller 18 uses the phase x obtained in this manner to produce results of the interpolation arithmetic operation for the vertical direction in the PEs 5 by an arithmetic operation process of the expression (11) wherein the successive interpolation arithmetic operation results for the horizontal direction stored in the PEs 5 are placed as DATA1 and DATA2.

In this instance, similarly as upon enlargement, the controller 18 issues a command COM so that the weighting coefficients x and (1−x) are produced by the arithmetic operation processes common between different lines represented by the expressions (15) and (16) and an interpolation arithmetic operation is performed with the same arithmetic operation processes common to the lines using the weighting coefficients x and (1−x).

It is to be noted that the controller 18 executes the arithmetic operation process of (M−L)/M in the expression (15), which is a dividing process necessary for production of the weighting coefficient, within a vertical synchronization period as described hereinabove in connection with step SP4 of FIG. 2. Further, similarly as in the case of the process for the horizontal direction, since the second expression of the expressions (16) corresponds to unnecessary data, the processing can be simplified by applying the first expression to the second expression on the premise that a sampling out process is executed upon outputting of image data. Consequently, the interpolation arithmetic operation processes for the vertical direction can be executed simply.

It is to be noted that, if the process for reduction is executed for the vertical direction in this manner, then wasteful data described in the case for the process for the horizontal direction is accumulated in a unit of a line in the PEs 5. Consequently, in the reproduction process, the controller 18 outputs image data while sampling out the unnecessary image data in a unit of a line thereby to eliminate outputting of the unnecessary data similarly as in the case of the reduction for the horizontal direction.

1-1-4. Outputting of Interpolation Process Results

While the controller 18 performs an interpolation arithmetic operation process for the horizontal direction and the vertical direction in this manner, it suitably outputs interpolation arithmetic operation results from the PEs 5.

In particular, in the process for enlargement, when interpolation arithmetic operation process results for the vertical direction are obtained, the controller 18 outputs the interpolation arithmetic operation process results in the inputted order. Consequently, the output image data DV2 are outputted through the buffer 4.

Figure 12:
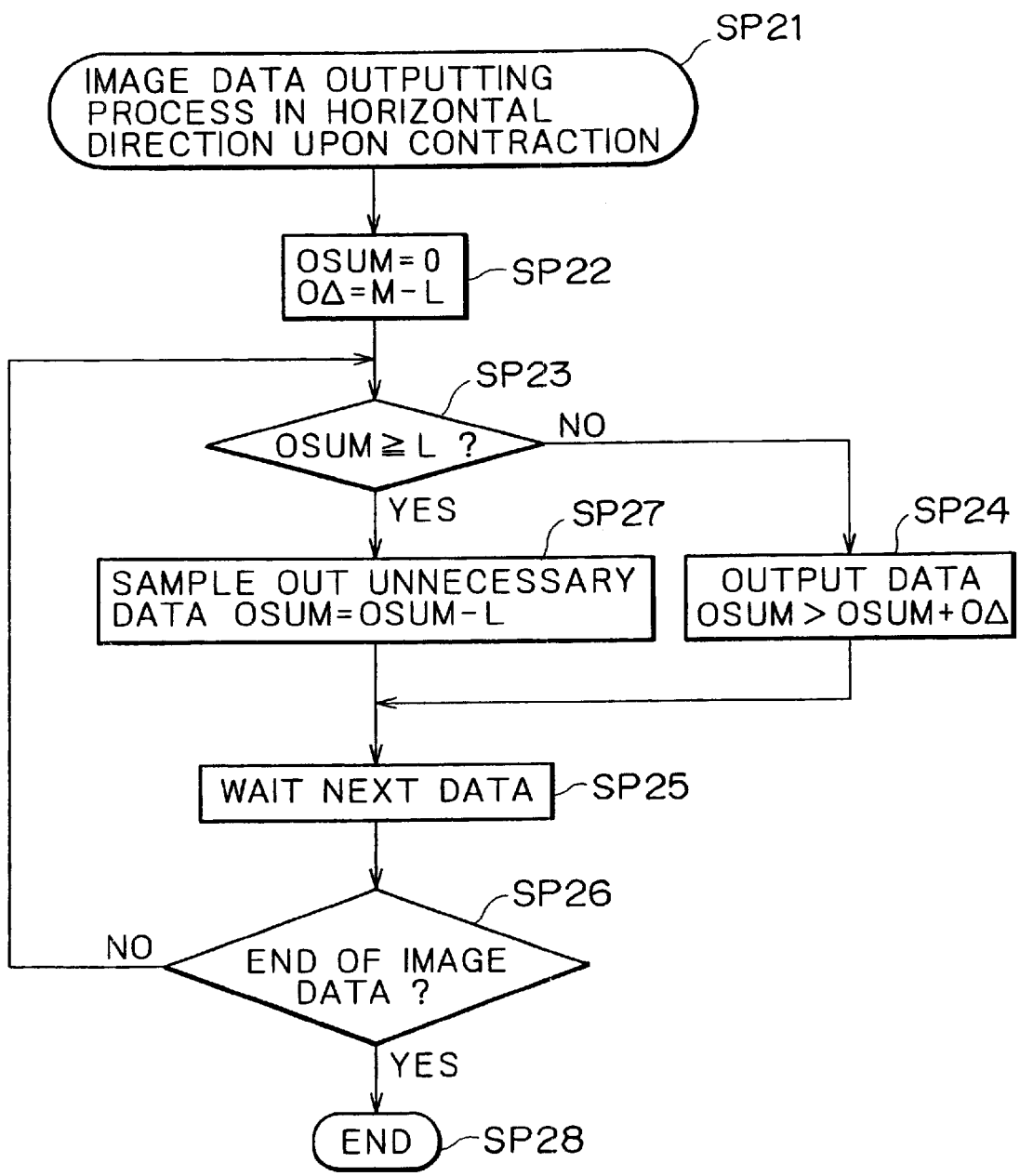
FIG. 12 is a flowchart illustrating a processing procedure in outputting image data in a horizontal direction upon reduction.

On the other hand, in the process for reduction, when interpolation arithmetic operation process results for the vertical direction are obtained, the controller 18 samples out unnecessary data from the interpolation arithmetic operation results and outputs resulting data. FIG. 12 is a flowchart illustrating a processing procedure for sampling out unnecessary data from interpolation arithmetic operation process results which are successive in the horizontal direction and outputting resulting data.

Referring to FIG. 12, the controller 18 advances its processing from step SP21 to step SP22, in which a variable OSUM is set to the value 0. The variable OSUM here is a variable used for calculation of a timing at which unnecessary data is to be sampled out. Further, the controller 18 calculates a difference value $\circ\Delta$=L−M between the denominator and the numerator from the enlargement ratio r=L/M.

Consequently, when format conversion is to be performed from image data DV1 of the VGA into image data DV2 of the SVGA, the enlargement ratio r=5/4 is obtained, and the value 1 is obtained as the difference value $\circ\Delta$.

Then, the controller 18 is set so that interpolation process results for one line may be outputted from the successive PEs 5 in the inputted order of the input image data DV1, and then advances its processing to step SP23. In step SP23, the controller 18 discriminates whether or not the value of the variable OSUM is greater than the value L of the magnification L/M on the image data DV1 side.

If a negative result is obtained in step SP23, then the controller 18 advances its processing to step SP24, in which it stores the interpolation results outputted from the PEs 5 into the buffer 4. Further, the controller 18 adds the difference value $\circ\Delta$ to the variable OSUM and then advances its processing to step SP25. In step SP25, the controller 18 waits for outputting of next interpolation results. Then in next step SP26, the controller 18 discriminates whether or not outputting for one line is completed. If a negative result is obtained in step SP26, then the controller 18 returns the processing to step SP23.

Consequently, the controller 18 stores interpolation results outputted successively thereto into the buffer 4 while successively incrementing the variable OSUM with the difference value $\circ\Delta$=L−M between the integer values M and L which form the integer ratio M:L of pixel values before and after the conversion until the variable OSUM exceeds the integer value M.

If the variable OSUM exceeds the integer value M as a result of the incrementing of the variable OSUM in this manner, then an affirmative result is obtained in step SP23. Consequently, the controller 18 now advances its processing from step SP23 to step SP27, in which it stops the storage of interpolation results outputted from the PEs 5 into the buffer 4 thereby to sample out the interpolation result. Further, the controller 18 subtracts the integer value L from the variable OSUM.

Consequently, when format conversion is to be performed from the image data DV1 of the SVGA to the output image data DV2 of the VGA, the controller 18 samples out an interpolation result in a period of five pixels in the horizontal direction and thus outputs the output image data DV2 of the desired number of pixels.

Thus, in the process for reduction, after interpolation results are outputted for one line while sampling out is performed in accordance with the magnification in this manner, an affirmative result is obtained in step SP26. Consequently, the controller 18 advances its processing from step SP26 to step SP28, in which it ends the processing procedure.

On the other hand, for the vertical direction, the controller 18 executes a sampling out process in a unit of one line based on the count value of the line counter in a similar manner as in the process for the horizontal direction.

1-2. Operation of the First Embodiment

In the image display apparatus of the present embodiment having the construction described above, a processing program is loaded into the programmable video DSP 11 (FIG. 20) from the controller which controls operation of the entire image display apparatus, and input image data DV1 successively inputted are converted in format into output image data DV2 and the output image data DV2 are displayed on the display apparatus in accordance with the processing program.

In the processing of the image display apparatus, after all of the PEs 5 in the programmable video DSP 11 are reset (FIG. 2), the numbering process is executed first. Consequently, successive order numbers are allocated to and recorded into the PEs 5 in accordance with a sequential order corresponding to the array of the input image data DV1 (FIG. 3).

In the programmable video DSP 11, arithmetic operation processing is performed simultaneously and parallelly in the PEs 5 using PE numbers which are the numbers recorded in this manner so that weighting coefficients to be used for an interpolation arithmetic operation process for the horizontal direction are produced by the PEs 5. Consequently, in the programmable video DSP 11, even if the weighting coefficients to be used by the PEs 5 in the interpolation arithmetic operation process for the horizontal direction are different, the weighting coefficients individually corresponding to the PEs 5 can be set by an arithmetic operation process with the same arithmetic operation expression. Further, a process of weighted addition can be executed with the same arithmetic operation expression in which the weighting coefficients are used.

Consequently, in the programmable video DSP 11, such a complicated process wherein different series of commands are issued to individually different PEs so that different arithmetic operation processes are executed by the PEs as in the prior art can be simplified. Further, the control program to be stored into the memory 19 can be simplified to reduce the capacity of the memory 19. Further, as commands can be simplified, the time required for the processing can be reduced to allow input image data DV1 to be processed on the real time basis. Further, processes of various image processing effects can be executed separately and additionally. Furthermore, it is possible to complicate the arithmetic operation expression to augment the capacity of the interpolation process.

Further, by producing weighting coefficients by an arithmetic operation process of the PE numbers of the PEs 5 wherein the number of pixels of input/output image data are used, corresponding weighting coefficients can be produced by the same arithmetic operation process with various conversion ratios. Accordingly, in comparison with such a construction that weighting coefficients are stored separately and outputted as in a device for exclusive use according to the conventional construction, various conversion ratios can be used flexibly with a simple construction. Particularly in a construction wherein weighting coefficients are stored separately and outputted, as the conversion ratio becomes more complicated, also the number of weighting coefficients increases, and the overall construction becomes large as much. However, according to the present embodiment, even if the conversion ratio becomes complicated, this can be coped with by merely varying the arithmetic operation expression used by the PEs 5 side to calculate weighting coefficients. Consequently, the present embodiment can cope with such complication of the conversion ratio simply and flexibly as much.

On the other hand, for the vertical direction, the count values of the number of lines which are position information of individual lines are used as a variable to calculate weighted coefficients with an arithmetic operation expression which is common to the lines, and an interpolation arithmetic operation process is executed by weighted addition with an arithmetic operation expression common to the lines in which the weighting coefficients are used. Consequently, in the programmable video DSP 11, interpolation results for the vertical direction can be obtained by a process significantly simpler than such a process wherein different arithmetic operation expressions are used for different lines to perform an interpolation arithmetic operation as in the prior art, that is, by repetition of an arithmetic operation process wherein only a variable is updated. Consequently, also for the vertical direction, a complicated process can be simplified, and besides, a control program to be stored into the memory 19.can be simplified and the capacity of the memory 19 can be reduced. Further, as commands are simplified, the time required for the processing can be reduced so that input image data DV1 can be processed on the real time basis. Further, processes for various image processing effects can be executed separately and additionally. Also it is possible to complicate the arithmetic operation process to augment the characteristic of the interpolation process.

Similarly as in the process for the horizontal direction, corresponding weighting coefficients can be produced by the same arithmetic operation process with various conversion ratios. Accordingly, in comparison with such a construction that weighting coefficients are stored separately and outputted as in a device for exclusive use according to the conventional construction, various conversion ratios can be used flexibly with a simple construction.

In particular, in the programmable video DSP 11, after a preparatory arithmetic operation process is performed in advance making use of a vertical synchronization period, input image data DV1 for one line are successively inputted to the PEs 5. In this instance, where the input image data DV1 are to be processed for enlargement, dummy data is inserted into the input image data DV1 at predetermined timings and resulting input image data DV1 are successively inputted to the PEs 5 (FIGS. 4 and 5).

In particular, in the programmable video DSP 11, the difference value XΔ between integer values which form an integer ratio M:L (corresponding to a ratio of magnification of enlargement) which is a simplified ratio between the number of pixels of input and output image data is accumulated for each of the input image data DV1, and dummy data is inserted at a timing at which the variable SUM which is the thus accumulated value exceeds a value equal to an integral number of times the integer value L on the output image data DV2 side (FIG. 4).

Consequently, dummy data is inserted in accordance with the magnification of enlargement. For example, when the image data DV1 of the VGA are to be converted in format into image data DV2 of the SVGA (FIG. 5), dummy data is inserted in a period of 4 pixels. Consequently, for the convenience of calculation, the number of pixels of the input image data DV1 is set so as to be equal to the number of pixels of the output image data DV2 thereby to make it possible to successively output results of the arithmetic operation process of the successive PEs 5 so that the image data DV2 of the intended number of pixels may be outputted.

Further, in a preparatory arithmetic operation process, an integer value representative of a phase relationship to the input image data is recorded into each of the PEs 5 by an arithmetic operation process of the PE 5 in which its PE number is used (FIGS. 1A to 1C). Further, by an arithmetic operation process in which the integer value is used, weighting coefficients x and (1−x) for a weighting arithmetic operation expression represented in a generalized form are recorded into each of the PEs 5.

In particular, in the programmable video DSP 11, a phase difference (M−L)/L at a pixel between input and output image data where the pixel interval of the input image data DV1 is represented in a normalized form is multiplied by the PE number PENO to calculate an accumulated value of the phase difference between the input and output image data in each PE 5, and a phase difference x which varies in response to the magnification of enlargement is calculated by remainder calculation of the accumulated value in which the integer value L of the output image data side is set as the base (expressions (6) and (7)). In interpolation arithmetic operation according to a bilinear approximate function, the phase x is set to a weighting coefficient of an arithmetic operation expression (expression (4)) which is a generalized representation of the interpolation arithmetic operation expressions for the different PEs 5, and the remaining weighting coefficient (1−x) is calculated from the weighting coefficient x. Then, the weighting coefficients x and (1−x) are set to each of the PEs 5.

In the interpolation process for the horizontal direction, the weighting coefficients x and (1−x) set in this manner are used commonly between the different lines. Consequently, in the programmable video DSP 11, the same weighted addition process common to the individual lines is executed with the weighting coefficients set in this manner, and the weighting process and an inputting process of image data for one line are repeated so that the interpolation process for the horizontal direction with regard to the input image data DV1 successively inputted is executed in a unit of a line.

Since the phase x is calculated in each of the PEs 5 and weighting coefficients are calculated from the phase x in this manner, where various interpolation functions are applied, this can be coped with by changing the arithmetic operation expression for calculation of the weighting coefficients from the phase x. Consequently, the present embodiment can cope flexibly with various interpolation arithmetic operation processes.

In this instance, in the present embodiment, weighting coefficients x and (1−x) are set to each of the PEs 5 in a preparatory arithmetic operation process allocated to a vertical synchronization period. Consequently, a sufficient margin in time can be provided in a weighted addition process for such successive input image data DV1, and the input image data DV1 can be processed sufficiently on the real time basis as much.

Particularly in calculation of the weighting coefficient x, since the process of calculating the phase difference (M−L)/L at a pixel between the input and output image data includes a process of division for which much arithmetic operation time is required, the process can be executed in a vertical synchronization period to reduce the load upon actual weighted addition processing.

As regards a timing at which dummy data is to be inserted, initialization of the variable SUM and calculation of the difference value XΔ which are part of a process of calculation of a timing at which dummy data is to be inserted are executed within a vertical synchronization period of the input image data DV1. Also by this, in the programmable video DSP 11, a sufficient margin in time can be provided for the weighted addition process of the successive input image data DV1, and the input image data DV1 can be processed sufficiently on the real time basis as much.

If an interpolation arithmetic operation process is executed in a unit of line for the horizontal direction in this manner until interpolation results for the horizontal direction by a number of lines necessary for an interpolation arithmetic operation processing for the vertical direction are stored into the local memory 7 of each of the PEs 5, then the programmable video DSP 11 executes an interpolation arithmetic operation for enlargement for the vertical direction.

In the programmable video DSP 11, for the interpolation process for the vertical direction, dummy data is inserted, in the process of successively storing the input image data DV1 into the PEs 5 described hereinabove in connection with the interpolation process for the horizontal direction, in a unit of one line with reference to the count value of the number of lines by the line counter so that the relationship between the input image data DV1 and the output image data DV2 formed upon interpolation arithmetic operation for the horizontal direction is formed also for the vertical direction.

Further, in the programmable video DSP 11, a phase x is calculated by an arithmetic operation process (the expressions (13) and (14)) similar to that for the horizontal direction in which the count value of the number of lines is used in place of the PE number, and the weighting coefficients x and (1−x) of the arithmetic operation expression (expression (4)) which represents an interpolation arithmetic operation for each line in a generalized form are calculated from the phase x.

In the programmable video DSP 11, an arithmetic operation process is performed for interpolation results for the horizontal direction stored in the PEs 5 and dummy data based on the weighting coefficients x and (1−x) thereby to produce interpolation results for the vertical direction.

In this instance, in the programmable video DSP 11, a process of division which is part of calculation of a timing at which dummy data is to be inserted is executed making use of a vertical synchronization period of the input image data DV1 similarly as in the process for the horizontal direction. Consequently, a sufficient margin in time can be provided for an actual weighting process, and the input image data DV1 can be processed sufficiently on the real time basis as much.

Further, the part of division represented by (L−M)/L from within the calculation of the phase x represented by the expression (13) in which the count value of the number of lines is used is calculated in advance within a vertical synchronization period of the input image data DV1. Also this can provide a sufficient margin in time to an actual weighting process, and the input image data DV1 can be processed sufficiently on the real time basis as much.

Thus, in the programmable video DSP 11, in a process for enlargement, interpolation process results for the vertical direction produced in such a manner as described above are successively outputted in an order corresponding to the inputted order, and output image data DV2 having a converted format can be obtained from the interpolation process results.

On the other hand, in a process for reduction, in the programmable video DSP 11, the input image data DV1 are successively stored into the PEs 5 without insertion of dummy data for the horizontal direction and the vertical direction. Further, by an arithmetic operation process modified so as to be ready for the reduction process in which PE numbers similar to those upon enlargement are used (the expressions (11) and (12)), the phase x of each of the PEs 5 is calculated and the weighting coefficients x and (1−x) are calculated from the phase x.

Also in this reduction process, in the programmable video DSP 11, the weighting coefficients x and (1−x) are calculated in this manner with the arithmetic operation process common to the PEs 5. Further, a weighted addition process is performed with the weighting coefficients to execute an interpolation arithmetic operation process.

Further, similarly as in the case of enlargement, for the vertical direction, the phase x is calculated by an arithmetic operation process common to different lines in which the count value of the number of lines is used as a variable in place of the PE number, and the weighting coefficients x and (1−x) in an arithmetic operation expression which represents interpolation arithmetic operation for each line in a generalized form are calculated from the phase x to effect an interpolation arithmetic operation process.

In the process for reduction, calculation of division from within the process of calculating weighting coefficients for the individual lines is calculated in advance within a vertical synchronization period of the input image data DV1. Also by this, a sufficient margin in time can be provided in an actual weighting process, and the input image data DV1 can be processed sufficiently on the real time basis as much.

In the process for reduction, interpolation results obtained by an interpolation arithmetic operation process for the horizontal direction and the vertical direction in this manner and stored in the PEs 5 are outputted in an order corresponding to the inputted order. In this instance, the interpolation results are sampled out in a predetermined pixel period for the horizontal direction and in a predetermined line period for the vertical direction, and resulting data are outputted. Consequently, in the process for reduction, output image data DV2 of a format converted from that of the input image data DV1 can be obtained.

In the programmable video DSP 11, unnecessary data of the output image data DV2 are removed by the sampling out process, and a timing for the sampling out is determined by an arithmetic operation process similar to the arithmetic operation process for a timing at which dummy data is to be inserted but modified so as to be ready for the process for reduction. In the programmable video DSP 11, part of calculation also for a timing for sampling out is executed in advance within a vertical synchronization period. Also by this, the input image data DV1 can be processed on the real time basis.

1-3. Effects of the First Embodiment

According to the construction described above, since sequential order numbers are allocated to PEs, which are element processors, in an order corresponding to an array of input image data and each of the PEs is controlled so that it produces corresponding weighting coefficients based on the number allocated thereto, even where the PEs execute different weighted arithmetic operation processes from each other to perform an interpolation arithmetic operation process in a horizontal direction, such a process as format conversion can be executed by simpler processing than ever. Accordingly, the control program for the controller 18 can be simplified as much, and the configuration of the memory 19 for recording the control program can be reduced. Further, as commands can be simplified, the time required for the processing can be reduced thereby to allow the input image data DV1 to be processed on the real time basis. Further, processes for various image processing effects can be executed separately and additionally. Also it is possible to complicate the arithmetic operation expression to augment the characteristic of the interpolation process.

Further, corresponding weighting coefficients can be produced by the same arithmetic operation process with various conversion ratios. Accordingly, in comparison with such a construction that weighting coefficients are stored separately and outputted as in a device for exclusive use according to the conventional construction, various conversion ratios can be used flexibly with a simple construction.

Further, in this instance, by executing production of weighting coefficients within a vertical synchronization period of the input image data, a sufficient margin in time can be provided in a weighted addition process for such successive input image data DV1, and the input image data DV1 can be processed sufficiently on the real time basis as much.

Further, by calculating a value indicative of a phase of output image data with respect to input image data based on a number allocated to each PE and then producing weighting coefficients based on the value, even where various interpolation functions are used, this can be coped with flexibly by varying the arithmetic operation process of the value.

In a process for enlargement wherein the number of samples of input image data is increased, by inserting predetermined dummy data into the input image data and successively inputting resulting data to the PEs 5 so that they may be processed by the PEs 5, output image data of the intended number of samples can be obtained by a simple process only of correcting the number of pixels so that it may correspond to the number of samples of output image data in advance, performing an arithmetic operation process and outputting results of the interpolation arithmetic operation successively.

Further, in this instance, by executing part of calculation of a timing at which dummy data is to be inserted within a vertical synchronization period of input image data, a sufficient margin in time can be provided for the weighted addition process of the input image data DV1, and the input image data DV1 can be processed sufficiently on the real time basis as much.

Further, in a process for reduction wherein the number of samples of input image data is reduced, by sampling out arithmetic operation results obtained from the PEs 5 and outputting resulting data, output image data of the intended number of samples can be obtained by a simple process only of performing a weighted addition process of the input image data, sampling out resulting data of the weighted addition process and outputting the resulting sample data.

In this instance, by executing part of calculation of a timing, at which the arithmetic operation results are to be sampled out, within a vertical synchronization period of the input image data, a sufficient margin in time can be provided for the weighted addition process of the input image data DV1, and the input image data DV1 can be processed sufficiently on the real time basis as much.

Further, by repeating such a first weighted addition process which is a weighted addition process for a horizontal direction as described above and a second weighted addition process for a vertical direction which is based on interpolation results accumulated in the PEs by repetitions of the first weighted addition process, the number of sampless of image data in the horizontal direction and the vertical direction can be converted by simple arithmetic operation processing by the single programmable video DSP 11. Consequently, the format of image data can be converted with a simple construction.

Further, in this instance, by calculating the weighting coefficients for the second weighted addition process by arithmetic operation in which the count value of a line counter which is position information of image data relating to the second weighted addition and an arithmetic operation expression common to the lines is used as a variable, even where the weighting coefficients are different between different lines, the same arithmetic operation process can be used to perform an interpolation arithmetic operation process, and the input image data can be processed by a simpler process as much. Accordingly, the control program for the controller 18 can be simplified as much, and the configuration of the memory 19 into which the control program is recorded can be reduced in scale. Further, as commands can be simplified, the time required for the processing can be reduced thereby to allow the input image data DV1 to be processed on the real time basis. Further, processes of various image processing effects can be executed separately and additionally. Furthermore, it is possible to complicate the arithmetic operation expression to augment the capacity of the interpolation process.

Further, corresponding weighting coefficients can be produced by the same arithmetic operation process with various conversion ratios. Accordingly, in comparison with such a construction that weighting coefficients are stored separately and outputted as in a device for exclusive use according to the conventional construction, various conversion ratios can be used flexibly with a simple construction.

Further, by producing weighting coefficients to be used for the second weighted addition process for the vertical direction so as to correspond to a magnification which represents a ratio of variation of the number of samples by the first weighted addition process, the weighting coefficients can be applied also to a process for enlargement or reduction of an image in the horizontal direction and/or the vertical direction with a magnification, for example, provided from a host controller.

Further, by executing calculation of the division necessary for production of weighting coefficients for the second weighted addition process in this instance within a vertical synchronization period of image data, a sufficient margin in time for the weighted addition process of the input image data DV1 can be provided, and the input image data DV1 can be processed sufficiently on the real time basis as much.

Further, where the second weighted addition process is a process wherein the number of samples of image data is increased, by setting predetermined dummy data in a unit of a line, output image data of the intended number of samples can be obtained by a simple process only of correcting the number of lines so that it may correspond to the number of lines of output image data in advance, performing an arithmetic operation process and outputting results of the interpolation arithmetic operation successively.

Further, by executing part of the calculation of a timing, at which dummy data is to be set, within a vertical synchronization period of the input image data, a sufficient margin in time can be provided for the weighted addition process of the input image data DV1, and the input image data DV1 can be processed sufficiently on the real time basis as much. 2. Other Embodiments While, in the embodiment described above, sequential order numbers are set to the local memories of the PEs and used in an arithmetic operation process, the present invention is not limited to this, and, for example, in a DSP in which a number is set for each PE in advance, the number may be utilized for an arithmetic operation process.

Further, while, in the embodiment described above, it is discriminated whether or not dummy data should be inserted each time image data is inputted and a process is executed based on the discrimination, the present invention is not limited to this, and it is otherwise possible to perform an arithmetic operation process in advance to execute calculation of a timing at which dummy data is to be inserted and insert dummy data based on a result of the calculation.

Further, while, in the embodiment described above, it is discriminated for each line whether or not dummy data is to be inserted and a process is performed based on the discrimination, the present invention is not limited to this, and it is otherwise possible to perform an arithmetic operation process in advance to execute calculation of a timing at which dummy data is to be inserted and insert dummy data in a unit of a line based on a result of the calculation.

Further, while, in the embodiment described above, it is discriminated whether or not sampling out is to be performed for each image data and a process is executed based on the discrimination, the present invention is not limited to this, and it is otherwise possible to perform an arithmetic operation process in advance to execute calculation of a timing at which sampling out is to be performed and perform sampling out based on a result of the calculation.

Further, while, in the embodiment described above, it is discriminated whether or not sampling out is to be performed for each line and a process is executed based on the discrimination, the present invention is not limited to this, and it is otherwise possible to perform an arithmetic operation process in advance to execute calculation of a timing at which sampling out is to be performed. Further, an interpolation process for the vertical direction may be omitted for a line to be sampled out.

Further, while, in the embodiment described above, an integer ratio M:L obtained by dividing the number of pixels of input and output image data by the greatest common measure is used to calculate a weighting coefficient, a timing at which dummy data is to be inserted or a timing at which unnecessary data is to be sampled out, the present invention is not limited to this, and if necessary, it is otherwise possible to use the number of pixels of input and output image data as they are to calculate them.

Further, while, in the embodiment described above, weighting coefficients are calculated so that the sum total of them may be the value 1, the present invention is not limited to this, and since weighting coefficients to be used for weighted addition are normally used in a normalized form, for example, where the value for normalization in the addition process is determined in advance, a weighting coefficient may be determined in a normalized form in advance as represented by the following expression in place of the expression (14):

$$\times 1024 = \frac{amari}{L} \times 1024 \quad (18)$$

where x1024 is a value when a weighting coefficient is normalized with 10 bits (1,024). Since the value L of the denominator of the right side of the expression (18) above is a value which does not vary between lines, where 1,024/L is determined by calculation within a vertical synchronization period, the arithmetic operation process for each line can be reduced, for example, in the interpolation arithmetic operation process for the vertical direction.

Figure 13:
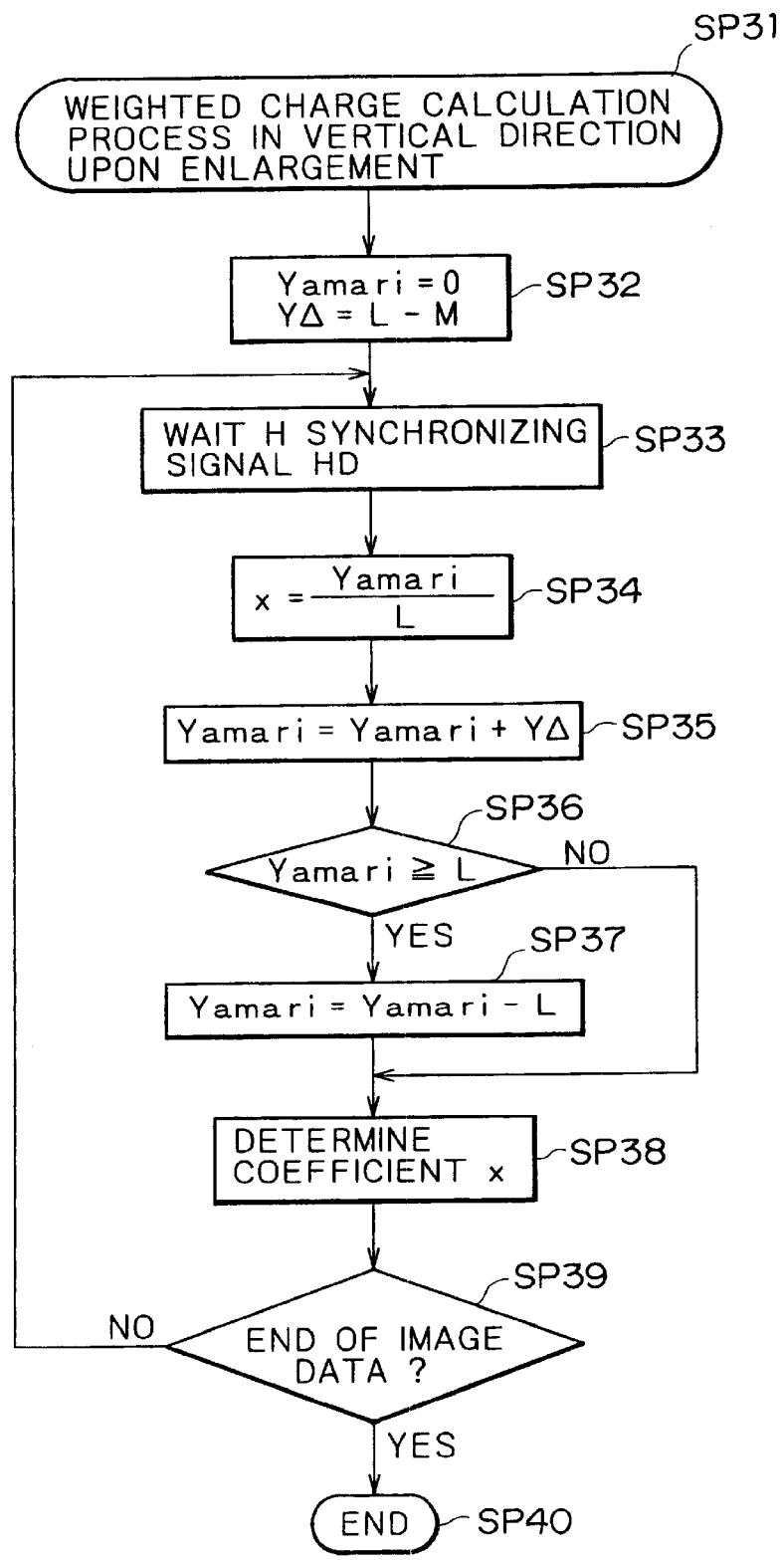
FIG. 13 is a flowchart illustrating a calculation processing procedure for weighting coefficients for a vertical direction upon enlargement according to a second embodiment of the present invention.
Figure 14:
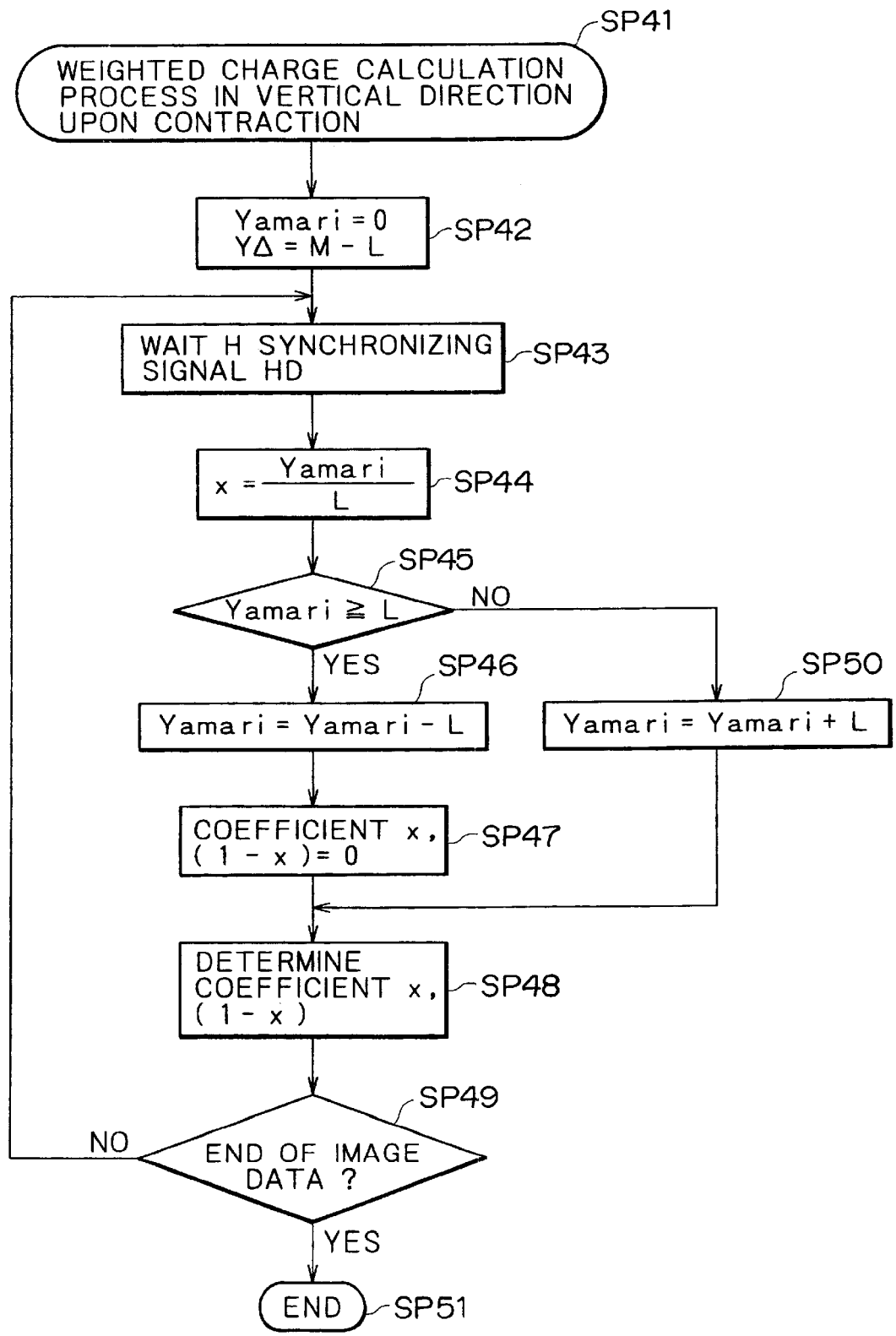
FIG. 14 is a flowchart illustrating a calculation processing procedure for weighting coefficients for a vertical direction upon reduction according to the second embodiment.

Further, while, in the embodiment described above, the weighting coefficients x for the vertical direction are determined by an arithmetic operation process of the controller 18, the present invention is not limited to this, and for example, the weighting coefficients may otherwise be determined by execution of, for example, such a processing producer as illustrated in FIG. 13 or 14. In the processing procedure illustrated in FIG. 13 or 14, arithmetic operation of division which requires heavy processing is not executed, and consequently, the time required for the processing can be reduced as much.

In particular, FIG. 13 illustrates a processing procedure for enlargement. Referring to FIG. 13, the controller advances its processing from step SP31 to step SP32, in which it sets the variable Yamari to the value 0 to initialize the same. Further, from an integer ratio L:M obtained by dividing the number of pixel 1 of input image data and the number of pixels m of output image data in the vertical direction by the greatest common measure of them, the controller calculates a difference value YΔ between the integer values M and L which form the integer ratio. Then, the controller advances its processing to step SP33, in which it waits for inputting of a horizontal synchronizing signal HD thereby to wait for inputting of input image data DV1 for the next one line. Then, when inputting of input image data DV1 for the next one line is started, the processing advances to step SP34.

In step SP34, the controller divides the variable Yamari by the integer value L of the integer ratio M:L on the output image data side to temporarily calculate a weighting coefficient x. Then, the controller advances its processing to step SP35, in which it adds difference value YΔ to the variable Yamari to update the variable Yamari.

Then, the controller advances its processing to step SP36, in which it discriminates whether or not the variable Yamari exceeds the integer value L of the integer ratio M:L on the output image data DV2 side. If an affirmative result is obtained in step SP36, then the controller advances its processing to step SP37, in which it subtracts the integer value L from the variable Yamari to update the variable Yamari. Then in step SP39, the controller formally adopts the weighting coefficient x temporarily determined in step SP35.

The controller discriminates in next step SP39 whether or not the processing of the image data is completed. If a negative result is obtained in step SP39, then the processing returns to step SP33. On the other hand, if a negative result is obtained in step SP36, then the controller directly advances its processing from step SP36 to step SP38, in which it formally adopts the weighting coefficient x temporarily determined in step SP35 without updating the variable Yamari.

Consequently, the controller repeats the series of steps described above. Then, if the process for all of the image data is completed, then since an affirmative result is obtained in step SP39, the processing advances from step SP39 to step SP40, in which the processing procedure is ended.

FIG. 14 illustrates a processing procedure for reduction. Referring to FIG. 14, the controller advances its processing from step SP41 to step SP42, in which it sets the value of the variable Yamari to the value of 0. Further, the controller calculates a difference value YΔ between the integer values M and L which form an integer ratio L:M. Then, the controller advances its processing to step SP43, in which it waits for inputting of a horizontal synchronizing signal HD thereby to wait for inputting of input image data DV1 for the next one line. Then, when inputting of input image data DV1 for the next one line is started, the processing advances to step SP44.

In step SP44, the controller divides the variable Yamari by the integer value L of the integer ratio M:L on the output image data side to temporarily calculate a weighting coefficient x.

Then, the controller advances its processing to step SP45, in which it discriminates whether or not the variable Yamari exceeds the integer value L of the integer value M:L on the output image data DV2 side. If an affirmative result is obtained in step SP45, then the controller advances its processing to step SP46, in which it subtracts the integer value L from the variable Yamari to update the variable Yamari. Then in next step SP47, the controller sets the two weighting coefficients x and (1−x) to the value 0 so as to correspond to unnecessary data.

In next step SP48, the controller formally adopts the weighting coefficients x and (1−x) set in this manner. Then, the controller discriminates in next step SP49 whether or not the processing of the image data is completed. If a negative result is obtained in step SP49, then the processing returns to step SP43.

On the other hand, if a negative result is obtained in step SP45, then the controller advances its processing to step SP50. In step SP50, the controller adds the integer value L to the variable Yamari to update the variable Yamari, whereafter it directly advances its processing to step SP48. In step SP48, the controller formally adopts the weighting coefficient x temporarily determined in step SP44 and further calculates the remaining weighting coefficient (1−x).

Consequently, the controller repeats the series of steps described above. Then, if the process for all of the image data is completed, then since an affirmative result is obtained in step SP49, the processing now advances from step SP49 to step SP51, in which the processing procedure is ended.

Figure 15:
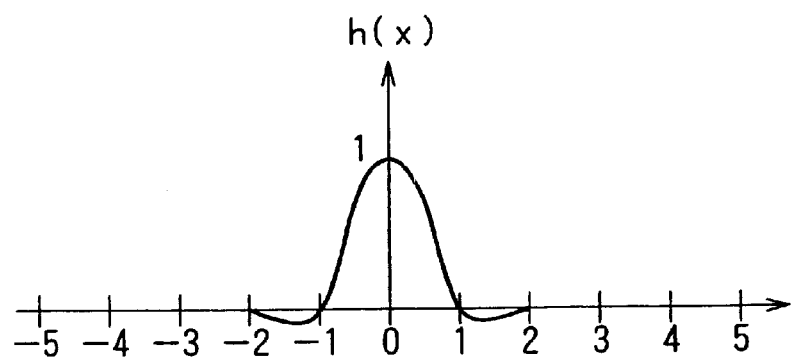
FIG. 15 is a characteristic diagram illustrating an interpolation function according to a Cubic function.

Further, while, in the embodiment described hereinabove, a bilinear approximate function is applied as the interpolation function, the present invention is not limited to this but can be applied widely where various interpolation functions are used such as where, for example, a Cubic function is used as the interpolation function as seen in FIG. 15.

It is to be noted that the Cubic function h(x) can be represented by the following expressions:

$$h(x)=|x|^3-2|x|^2+1(|x|\leq 1)\ h(x)=|x|^3+5|x|^2-8|x|+4(1<|x|\leq 2)\ h(x)=0(2<|x|) \quad (13)$$

Figure 16:
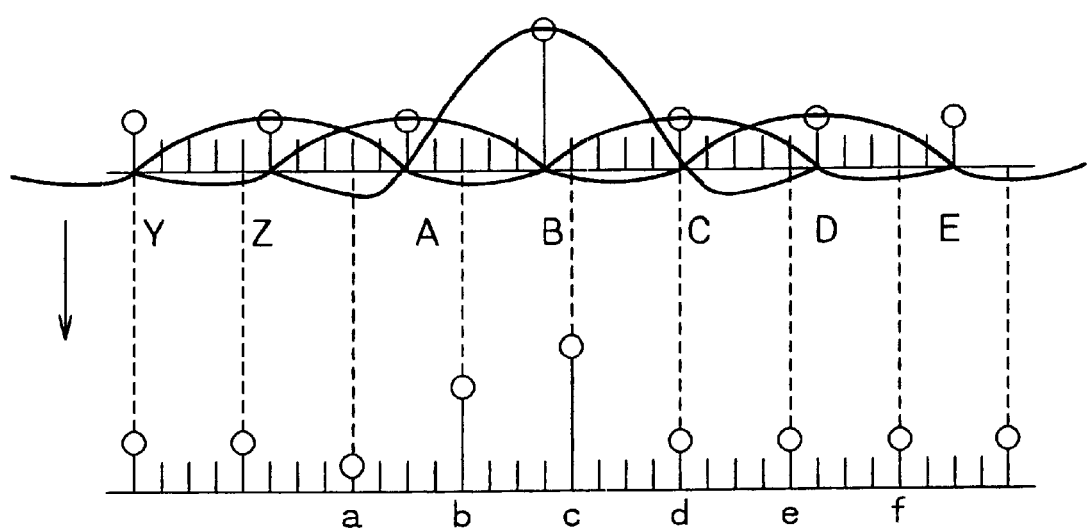
FIG. 16 is a characteristic diagram illustrating format conversion according to the interpolation function of FIG. 15.

For example, where the Cubic function h(x) is used to perform format conversion of image data of the VGX into image data of the SVGA as seen in FIG. 16, the format conversion can be performed by a weighted addition process of the following expressions:

$$a=Y\times h(8)+Z\times h(3)+A\times h(-2)+B\times h(-7)$$

$$b=Z\times h(7)+A\times h(2)+B\times h(-3)+C\times h(-8)$$

$$c=A\times h(6)+B\times h(1)+C\times h(-4)+D\times h(-9)$$

$$d=B\times h(5)+C\times h(0)+D\times h(-5)+E\times h(-10) \quad (20)$$

Further, while, in the embodiment described above, image data are inputted and outputted directly, the present invention is not limited to this, and image data may otherwise be inputted or outputted through a field memory as seen in FIG. 17. It is to be noted that, in this instance, dummy data may be inserted by the field memory on the input side, and unnecessary data may be removed by the field memory on the output side.

Further, while, in the embodiment described above, interpolation results for the horizontal direction are used for an interpolation arithmetic operation process for the vertical direction, the present invention is not limited to this, and it is otherwise possible to perform an interpolation arithmetic operation process for the vertical direction first and then perform an interpolation arithmetic operation process for the horizontal direction using results of the interpolation arithmetic operation process for the vertical direction.

Further, while, in the embodiment described above, image data are inputted and processed successively in the order of raster scanning, the present invention is not limited to this, and it is otherwise possible to vary the array of image data so that an interpolation arithmetic operation process for the vertical direction may be processed by successive PEs.

Further, while, in the embodiment described above, a single programmable video DSP performs an interpolation process for both of the horizontal direction and the vertical direction, the present invention is not limited to this but can be applied widely to various constructions such as a construction wherein two DSPs are connected in series and individually perform interpolation arithmetic operation processes for the horizontal direction and the vertical direction.

Further, while, in the embodiment described above, the present invention is applied to a programmable video DSP into which a control program can be uploaded from the outside, the present invention is not limited to this but can be applied widely to a DSP or the like of a configuration wherein, for example, a read only memory is applied as the memory.

Further, while, in the embodiment described above, the format of image data is converted, the present invention is not limited to this but can be applied also where an image is displayed in a partially enlarged or reduced scale.

Further, while, in the embodiment described above, the present invention is applied to an image display apparatus and converts the format of image data, the present invention is not limited to this but can be applied widely where image data are processed in various video apparatus.

Further, while, in the embodiment described above, the number of pixels which is the number of samples of image data is converted, the present invention is not limited to this but can be applied widely to various data processes such as, for example, a process of converting the sampling frequency of audio data.

As described above, according to the present invention, since each of element processors is controlled so that it produces corresponding weighting coefficients based on sequential order number data allocated to the element processor, where, for example, image data for one line are successively inputted to and processed by the element processors, an interpolation process is performed by arithmetic operation processing common to the different lines in which position information such as the position number is used as a variable. Consequently, such processes as format conversion can be executed by simpler processing than ever.

While the invention has been described with reference to a specific embodiment chosen for the purpose of illustration, it should be apparent that numeral modifications could be made thereto by those skilled in the art without departing from the basic concept and scope of the invention.

What is claimed is:

1. An interpolation processing apparatus, comprising:
a plurality of element processors connected in sequence, wherein the number of element processors is at least equal to the number of pixels in a row or a column of input data to be processed; each element processor for performing an arithmetic operation process in parallel with the other element processors on the row or column of the input data being processed; and
control means for commonly controlling said element processors so that said element processors individually perform a weighted addition process of the input data with weighting coefficients to effect interpolation processing for the input data;

each of said element processors having a memory for temporarily storing at least data in the course of the arithmetic operation process, the memories having number data allocated thereto which individually correspond to sequential order numbers of the input data;

said control means controlling said element processors to perform the arithmetic operation process based on the number data to simultaneously produce the weighting coefficients which are to be used for the weighted addition process by the corresponding element processors.

2. An interpolation processing apparatus according to claim 1, wherein each of said element processors calculates a value representative of a phase of output data corresponding to the input data based on the number data allocated to the element processor and then produces the weighting coefficients based on the calculated value.

3. An interpolation processing apparatus according to claim 1, wherein, where the weighted addition process is a process wherein the number of samples of the input data is increased, said control means inserts predetermined dummy data into the input data and successively inputs resulting data to said element processors.

4. An interpolation processing apparatus according to claim 1, wherein, where the weighted addition process is a process wherein the number of samples of the input data is decreased, said control means samples out results of the arithmetic operation process obtained from said element processors and outputs resulting data.

5. An interpolation processing apparatus according to claim 1, wherein, where the input data are image data, said control means controls said element processors so that the production of the weighting coefficients may be executed within a vertical synchronization period of the image data.

6. An interpolation processing apparatus according to claim 3, wherein, where the input data are image data, said control means execute all or part of calculation of timings at which the dummy data is to be inserted within a vertical synchronization period of the image data.

7. An interpolation processing apparatus according to claim 4, wherein, where the input data are image data, said control means execute all or part of calculation of timings at which the sampling out of the arithmetic operation results is to be performed within a vertical synchronization period of the image data.

8. An interpolation processing method wherein a plurality of element processors are connected in sequence and the number of element processors is at least equal to the number of pixels in a tow or a column of input data to be processed; each element processor for performing an arithmetic operation process in parallel with the other element processors on the row or column of the input data being processed; the plurality of element processors being commonly controlled by control means so that said element processors individually perform a weighted addition process of the input data with weighting coefficients to effect interpolation processing for the input data, said interpolation processing method controlling said control means to control said element processors to:

allocate, to memories individually provided in said element processors for temporarily storing at least data in the course of the arithmetic operation process, number data which individually correspond to sequential order numbers of the input data;

execute the arithmetic operation process based on the allocated number data to simultaneously produce the corresponding weighting coefficients; and execute a process of weighted addition with the produced weighting coefficients.

9. An interpolation display apparatus, comprising:

a plurality of element processors connected in sequence, wherein the number of element processors is at least equal to the number of pixels in a row or a column of input image data to be processed; each element processor for performing an arithmetic operation process in parallel with the other element processors on the row or column of the input image data being processed;

control means for commonly controlling said element processors so that said element processors individually perform a weighted addition process of the input image data with weighting coefficients to effect interpolation processing for the input image data to produce output image data; and a display screen for displaying the output image data of said control means;

each of said element processors having a memory for temporarily storing at least data in the course of the arithmetic operation process, the memories having number data allocated thereto which individually correspond to sequential order numbers of the input image data;

said control means controlling said element processors to perform the arithmetic operation process based on the number data to simultaneously produce the weighting coefficients which are to be used for the weighted addition process by the corresponding element processors.

10. An image display apparatus according to claim 9, wherein said control means controls said element processors so that the production of the weighting coefficients may be executed within a vertical synchronization period of the image data.

11. An image display apparatus according to claim 9, wherein each of said element processors calculates a value representative of a phase of output data corresponding to the input image data based on the number data allocated to the element processor and then produces the weighting coefficients based on the calculated value.

12. An image display apparatus according to claim 9, wherein, where the interpolation process is a process wherein the number of samples of the input image data is increased, said control means inserts predetermined dummy data into the input image data and successively inputs resulting data to said element processors.

13. An image display apparatus according to claim 12, wherein, where the input image data are image data, said control means execute all or part of calculation of timings at which the dummy data is to be inserted within a vertical synchronization period of the image data.

14. An image display apparatus according to claim 9, wherein, where the interpolation process is a process wherein the number of samples of the input image data is decreased, said control means samples out results of the arithmetic operation obtained from said element processors and outputs resulting data.

15. An image display apparatus according to claim 14, wherein said control means execute all or part of calculation of timings at which the sampling out of the arithmetic operation results is to be performed within a vertical synchronization period of the image data.

* * * * *